(12) United States Patent
Sinha et al.

(10) Patent No.: US 10,185,975 B2
(45) Date of Patent: Jan. 22, 2019

(54) PREDICTING UNSUBSCRIPTION OF POTENTIAL CUSTOMERS

(71) Applicant: Adobe Systems Incorporated, San Jose, CA (US)

(72) Inventors: Moumita Sinha, Kolkata (IN); Kandarp Sunil Khandwala, Maharashtra (IN); Harvineet Singh, Punjab (IN); Dharwar Prasanna Kumar Tejas, Karnataka (IN)

(73) Assignee: ADOBE SYSTEMS INCORPORATED, San Jose, CA (US)

( * ) Notice: Subject to any disclaimer, the term of this patent is extended or adjusted under 35 U.S.C. 154(b) by 466 days.

(21) Appl. No.: 14/614,252

(22) Filed: Feb. 4, 2015

(65) Prior Publication Data

US 2016/0225025 A1 Aug. 4, 2016

(51) Int. Cl.
*G06Q 30/00* (2012.01)
*G06Q 30/02* (2012.01)

(52) U.S. Cl.
CPC .................. *G06Q 30/0257* (2013.01)

(58) Field of Classification Search
CPC ................................................. G06Q 30/0257
See application file for complete search history.

(56) References Cited

U.S. PATENT DOCUMENTS

| | | | | |
|---|---|---|---|---|
| 2003/0229531 A1* | 12/2003 | Heckerman | ............ | G06Q 30/02 705/14.41 |
| 2004/0117239 A1* | 6/2004 | Mittal | ..................... | G06Q 30/02 705/7.32 |
| 2005/0169452 A1* | 8/2005 | Prigogin | ................ | G06Q 30/02 379/265.01 |
| 2011/0161512 A1* | 6/2011 | Wang | .................... | H04L 65/605 709/231 |
| 2012/0266191 A1* | 10/2012 | Abrahamsson | .... | G06Q 30/0224 725/35 |
| 2013/0191213 A1* | 7/2013 | Beck | .................. | G06Q 30/0267 705/14.53 |
| 2013/0246164 A1* | 9/2013 | Khanna | .............. | G06Q 30/0267 705/14.45 |

(Continued)

OTHER PUBLICATIONS

Niall, J. (Jan. 2000). The Email Marketing Dialogue. Forrester, Cambridge, MA.

(Continued)

*Primary Examiner* — Kambiz Abdi
*Assistant Examiner* — Scott C Anderson
(74) *Attorney, Agent, or Firm* — Keller Jolley Preece

(57) ABSTRACT

The present disclosure is directed toward systems and methods for generating an un-subscription model and predicting whether a potential customer will un-subscribe from receiving electronic marketing content from a marketing source. For example, systems and methods described herein involve generating a prediction un-subscription model that predicts whether a potential customer is prone to un-subscribe from receiving future communications about a product or merchant in response to receiving a communication for the product or merchant. The systems and methods further involve determining an appropriate action to take with regard to a potential customer based on whether the potential customer is prone to un-subscribe from receiving future communications.

19 Claims, 8 Drawing Sheets

(56) References Cited

U.S. PATENT DOCUMENTS

2014/0172995 A1* 6/2014 Deeter .................. H04L 51/32
709/206
2015/0220997 A1* 8/2015 Proctor ............. G06Q 30/0269
705/14.66
2015/0242887 A1* 8/2015 Agarwal ............ G06Q 30/0251
705/14.49

OTHER PUBLICATIONS

Grandcolas, U., Rettie, R., & Payne, V. (Feb. 2003). Email marketing: permission to pester. (http://eprints.kingston.ac.uk/6394/1/Grandcolas-U-6394.pdf).

Jolley, William, et al. (Sep. 2013) "Permission email messages significantly increase gambler retention." Journal of Business Research 66.9: 1617-1622.

VanBoskirk S. (Jun. 2014). The Best and Worst of Email Marketing. Forrester, Cambridge, MA.

Epsilon Report, (Jun. 2009): Inside the Inbox: Trends for the Multichannel Marketer. (http://www.epsilon.com/pdf/Global_Consumer_Email_Study_6_4_09.pdf).

Verbeke, Wouter, et al. "Building comprehensible customer churn prediction models with advanced rule induction techniques." Expert Systems with Applications 38.3 (Mar. 2011): 2354-2364.

Lemmens, Aurelie, and Christophe Croux. "Bagging and boosting classification trees to predict churn." Journal of Marketing Research 43.2 (May 2006): 276-286.

Burez, Jonathan, and Dirk Van den Poel. "Handling class imbalance in customer churn prediction." Expert Systems with Applications 36.3 (Apr. 2009): 4626-4636.

Coussement, Kristof, and Dirk Van den Poel. "Churn prediction in subscription services services: An application of support vector machines while comparing two parameter-selection techniques." Expert systems with applications 34.1 (Jan. 2008): 313-327.

Bonfrer, Andre, and Xavier Dreze (Jul. 2007): "Real-time evaluation of e-mail campaign performance." Marketing Science 28.2 251-263.

Blue Research Report (Jan. 2014). (http://www.marketingcharts.com/wp/online/consumers-don't-justignore-irrelevant-messaging-39254/).

* cited by examiner

PREDICTING UNSUBSCRIPTION OF POTENTIAL CUSTOMERS

CROSS REFERENCE TO RELATED APPLICATIONS

N/A

BACKGROUND

1. Technical Field

One or more embodiments described herein relate generally to communicating electronic marketing content. More specifically, one or more embodiments relate to predicting un-subscription of a user from receiving electronic marketing content.

2. Background and Relevant Art

Online marketing is an effective and convenient tool for marketers to reach out to potential customers in a cost effective manner. For example, a marketer can reach out to potential customers by way of an email marketing campaign to advertise or promote a particular product or merchant. Email campaigns often have a high response rate and enable a merchant or marketer to boost perception of a product and/or maintain customer interest in products. As such, a marketer can conveniently and effectively boost sales for one or more products by emailing potential customers.

While emailing is a cheap and effective way to disseminate information about a merchant or product, many people respond differently to receiving emails from marketers. For example, some people respond positively and become paying customers. On the other hand, some people may ignore or become desensitized to receiving emails and subsequently lose interest in a particular product or merchant. Unfortunately, most conventional email marketing programs do not distinguish or adequately target users. Indeed, most conventional email marketing programs send blind mass emails that fail to adequately time and target users.

Additionally, many potential customers not only ignore marketing emails, but also eventually choose to unsubscribe from receiving emails from marketers. In particular, many potential customers indicate an explicit interest in receiving marketing content from a marketer by subscribing to receive emails (e.g., special offers, coupons, sales) after visiting a web site or purchasing a product. While many of those subscribers respond positively to receiving periodic emails (e.g., purchasing an advertised product), some of those previously interested users become annoyed with frequent emails, eventually leading to un-subscription from receiving emails from the marketer. Losing subscribers as a result of a misdirected email marketing campaign often results in lost revenue from customers who would have eventually made a purchase.

Thus, current methods of electronic marketing include several disadvantages that may lead to lost revenue by causing potential future customers to unsubscribe.

SUMMARY

One or more embodiments described herein provide benefits and/or solve one or more of the foregoing or other problems in the art with systems and methods that allow marketers to adequately time and target electronic marketing campaigns. For example, one or more embodiments involve methods and systems for predicting a response of a potential customer to receiving an electronic message from a marketer. In particular, systems and methods described herein can include generating a prediction un-subscription model for determining whether a potential customer is prone to disengage from an electronic marketing campaign based on the receipt of an electronic message from the marketer.

In addition to generating the prediction un-subscription model, systems and methods described herein further facilitate accurately predicting whether a potential customer will disengage from an electronic marketing campaign. In particular, systems and methods described herein can identify features and interactions associated with a potential customer and determine whether the features and/or interactions indicate that the potential customer is prone to disengage from receiving further electronic messages from a marketer. In the case that the prediction un-subscription model indicates a likelihood that the customer will disengage from an electronic marketing campaign in response to the receipt of an electronic marketing content, the systems and methods may determine an appropriate alternative action or indicate timing when the electronic message will not likely lead to disengagement by the customer.

Additional features and advantages of the present invention will be set forth in the description which follows, and in part will be obvious from the description, or may be learned by the practice of such exemplary embodiments. The features and advantages of such embodiments may be realized and obtained by means of the instruments and combinations particularly pointed out in the appended claims. These and other features will become more fully apparent from the following description and appended claims, or may be learned by the practice of such exemplary embodiments as set forth hereinafter.

BRIEF DESCRIPTION OF THE DRAWINGS

In order to describe the manner in which the above recited and other advantages and features, a more particular description will be rendered by reference to specific embodiments thereof that are illustrated in the appended drawings. It should be noted that the figures are not drawn to scale, and that elements of similar structure or function are generally represented by like reference numerals for illustrative purposes throughout the figures. Understanding that these drawings depict only typical embodiments and are not therefore to be considered to be limiting of its scope, various embodiments will be described and explained with additional specificity and detail through the use of the accompanying drawings in which.

DETAILED DESCRIPTION

Figure 1:
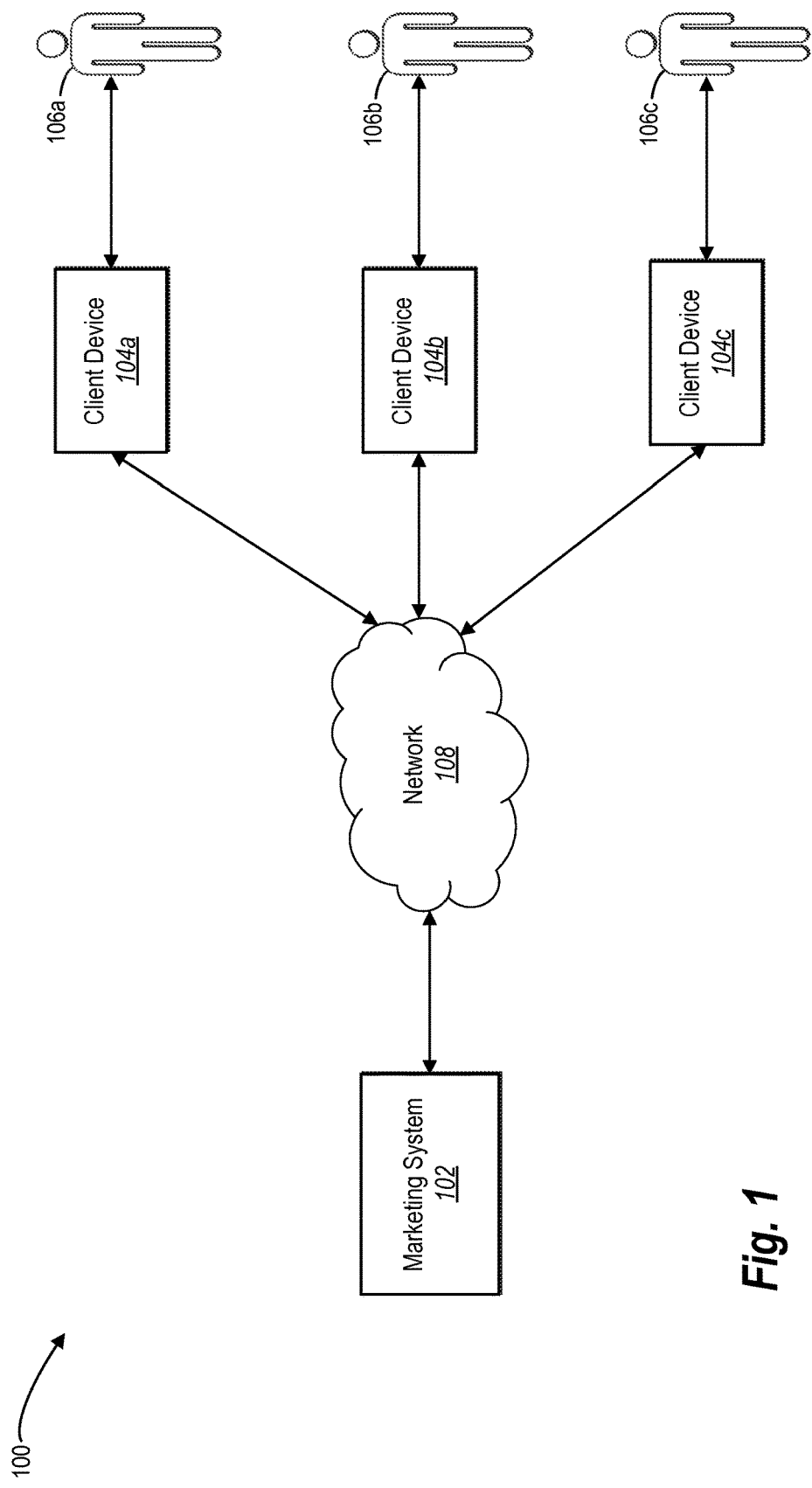
FIG. 1 illustrates a block diagram of an environment for implementing a marketing system in accordance with one or more embodiments.

One or more embodiments described herein include a marketing system for predicting user un-subscription from receiving electronic marketing content in a digital medium environment. In particular, some embodiments of a marketing system can generate an un-subscription model for determining whether a potential customer is prone to un-subscribe from receiving future communications about a product or merchant in response to receiving a communication for the product or merchant. Further, the marketing system can use the un-subscription model to predict whether a potential customer is prone to un-subscribe from receiving electronic marketing content from a marketing source. Moreover, the marketing system may determine whether to provide electronic marketing content to the potential customer based on whether the potential customer is prone to un-subscribe from receiving electronic marketing content from the marketing source.

With regard to generating an un-subscription model, the marketing system can analyze interactions associated with users who have un-subscribed from receiving electronic marketing content (or simply "un-subscribers") to generate an un-subscription model that accurately predicts future behavior of potential customers. In particular, the marketing system can identify interactions or combinations of interactions in common among un-subscribers to generate an un-subscription model that effectively predicts whether a set of interactions of a user with regard to electronic marketing content is indicative of the user un-subscribing from receiving electronic marketing content from a marketing source. For example, the marketing system can identify various interactions of un-subscribers, such as interactions with electronic marketing content, website interactions, and frequency of communications to the un-subscribers to build an un-subscription model that analyzes certain interactions or combinations of interactions and accurately predicts whether a potential customer will un-subscribe or continue receiving electronic marketing content from a marketing source.

The marketing system can further use the un-subscription model to accurately determine whether a potential customer that currently subscribes to receiving electronic marketing content is prone to un-subscribe from receiving electronic marketing content from a marketing source. In particular, the marketing system can track one or more interactions of a subscriber with regard to electronic marketing content from a marketing source. For example, the marketing system can identify various interactions associated with the potential customer, such as interactions of the potential customer with electronic marketing content, interactions of the potential customer with a website, and/or frequency of communications with the potential customer. The marketing system can further compare the interactions of the subscriber with un-subscribers that have un-subscribed from receiving electronic marketing content from the marketing source. Based on the comparison, the marketing system can calculate an un-subscription score (e.g., a likelihood or probability of the subscriber un-subscribing from receiving additional marketing content). The marketing system can further use the un-subscription score in conjunction with the un-subscription model to predict whether the potential customer is prone to un-subscribe from receiving electronic marketing content in response to receiving a further communication from the marketing source.

The marketing system can further use the prediction of whether the potential customer is prone to un-subscribe to determine the best course of action in communicating electronic marketing content to the potential customer. For example, if the potential customer is not prone to un-subscribing, the marketing system can provide electronic marketing content to the potential customer with reasonable certainty that the potential customer will not respond negatively to receiving the electronic marketing content by un-subscribing. Alternatively, if the potential customer is prone to un-subscribing, the marketing system can determine an alternative action to take with respect to the potential customer that is associated with a lower risk of un-subscription. For example, the marketing system can determine to delay the next electronic communication to the potential customer. Thus, the marketing system can avoid losing potential customers by selectively sending electronic marketing content to those potential customers who are less likely to un-subscribe from receiving the electronic marketing content in response to receiving communications from the marketing source. Additionally or alternatively, the marketing system can determine an alternative channel of communication for communicating marketing content to the potential customer.

The marketing system can use predictive un-subscription modeling to determine the likelihood that user un-subscribe from receiving the electronic marketing content from a marketer. In particular, the marketing system can track and analyze users' interactions with regard to electronic marketing content. In particular, the marketing system can use the collected data to build an un-subscription model to determine which interactions or characteristics indicate that a user is likely to unsubscribe. In particular, the marketing system can identify common user actions, timing/frequency of electronic marketing content, user or electronic marketing content attributes or other data common to users who unsubscribe. The marketing system can use this data to build an un-subscription model. The marketing system can use the un-subscription model to predict if a user will likely un-subscribe from receiving electronic marketing content in response to the receipt of additional electronic marketing content. Based on the determined likelihood of un-subscription, the marketing system can decide if and when to send future electronic content to the user to avoid causing the user to un-subscribe. Additionally or alternatively, the marketing system can decide to send the electronic marketing content via an alternative communication channel.

The marketing system can further use the un-subscription model and predictions to personalize/customize a campaign. For example, users often will add items or services to an electronic shopping cart associated with an ecommerce entity. Based on the un-subscription model, the marketing system can intelligently determine which users with abandoned carts should be sent reminders rather than blindly sending reminders to all such users.

As used herein, the term "potential customer" may refer to a user of an electronic device that may in the future purchase a product or service. A potential customer can comprise a past customer that may make future purchases. Alternatively, a potential customer can comprise a user that has not yet made purchases from the marketer.

As used herein, the term "electronic marketing content" refers to any form of digital data that may be transmitted over a communication network. For example, "electronic marketing content" can include, but is not limited to, web sites, digital media (e.g., audio, video, images), electronic documents, electronic messages, electronic advertisements, or any other digital data or combination of digital data. As an example, marketing content or advertising content can refer to an email including marketing or advertising material provided to a user from a marketing source. Additionally, as used herein, "electronic communications" or "electronic messages," include but are not limited to, emails, texts, instant messages, social media messages, etc. More specifically, electronic marketing content can comprise abandoned cart reminders, product campaign reminders, offer electronic messages, survey electronic messages, sale information electronic messages, new product launch electronic messages, etc.

As used herein, the term "subscriber" refers to a potential customer with which a marketer can communicate with using electronic marketing content. For example, a subscriber may refer to a user that has requested, authorized, or otherwise approved the receipt of electronic marketing content from a marketing source. More specifically, a subscriber can comprise a user that has registered to receive electronic communications from marketer or a targeted marketing campaign. Alternatively, a subscriber can comprise a user that has provided contact information (email, phone number, social media ID, etc.) to a marketer during a purchase or otherwise. In some embodiments, a subscriber may refer to any user that has not explicitly un-subscribed from receiving electronic marketing content from a marketing source.

Conversely, the term "un-subscriber" refers to any user that has un-subscribed from receiving further electronic marketing content from a marketer. For example, an un-subscriber may refer to a user who has communicated a disinterest to a marketing source in receiving electronic marketing content from the marketing source via email, text, instant message, social network, advertisements, etc. In one or more embodiments, an un-subscriber may refer to a user who was previously a subscriber and requested that further communications from the marketer cease. For instance, an un-subscriber can comprise a user who unsubscribes from a subscription based marketing campaign, such as an email campaign.

As used herein, the term "user interaction" (or simply "interaction") refers to user attributes, user characteristics, user actions, characteristics of user actions, characteristics of electronic marketing content, interactions between a user and a marketer, etc. In particular, an interaction can comprise any attribute, characteristic, trait, behavior, or other information that can help inform whether a subscriber is likely to un-subscribe. For example, as described in greater detail below, an interaction can comprise demographic information about a user, rate of opening electronic marketing content from a marketer, rate of clicks on electronic marketing content, interactions with a website of a marketer, online user behavior, browsing history of user, time since last purchase, etc.

As used herein, the term "un-subscription score" refers to an indication of a probability that a subscriber will unsubscribe from receiving electronic marketing content from a marketer. In particular, an un-subscription score comprises a percentage between 0 and 100. A low un-subscription score (e.g., 0% to approximately 35%) indicates that a subscriber is highly unlikely to un-subscribe from receiving electronic marketing content from a marketer. Conversely, a high un-subscription score of 100 (e.g., approximately 70% to 100%) indicates that a subscriber is highly likely to un-subscribe from receiving electronic marketing content from a marketer.

The un-subscription score can be based on sending electronic marketing content to a subscriber. In particular, an un-subscription score can indicate the likelihood that the subscriber will un-subscribe if electronic marketing content is sent to the subscriber at given time. For example, an un-subscription score can indicate the likelihood that a subscriber un-subscribes from an subscription-based email marketing campaign in response to an email from the marketer. As described in greater detail below, an un-subscription score can be based on a type of user, the type of electronic marketing content, the timing of the electronic marketing content or other factors.

A threshold un-subscription score can comprise an un-subscription score that indicates a high likelihood that a user will un-subscribe. The threshold un-subscription score can comprise a default score, a marketer selected score, or a machine-learned score. In one or more embodiments, the threshold un-subscription score can comprise a score between 0.60 and 1.00. In particular, the threshold un-subscription score can comprise a score between 0.65 and 0.85. In one or more embodiments the threshold un-subscription score can comprise a score of 0.70-0.80.

The marketing system can calculate the un-subscription scores based on collected data from subscribers and un-subscribers. In particular, the marketing system can determine which interactions with regard to marketing content are common to un-subscribers. The marketing system can further determine which interactions play the biggest role in a subscriber from un-subscribing. For example, the most common interaction among subscribers can indicate the largest role in causing un-subscription. Additionally or alternatively, the marketing system can identify the action and conditions of the action just prior to un-subscription. The marketing system can identify this action and the associated conditions as having the largest effect on un-subscription. Using this data, the marketing system can build an un-subscription model. In particular, the marketing system can identify a plurality of interactions with regard to marketing content and assign each interaction a weight according to the effect the particular interaction has on un-subscription.

In building the model, the marketing system can estimate the probabilities of predicting whether a customer will un-subscribe using logistic regression. The probability outputs from the logistic regression can comprise values between 0 and 1. The marketing system can determine a cut-off value from the logistic regression, which determines whether a customer will unsubscribe. The marketing system can determine the cut-off value based on a lift curve, which determines what cut-off value will give the optimum lift in correct predictions of unsubscribes, as compared to random assignments of customers.

Once the un-subscription model is built, the marketing system can determine an un-subscription score for a given subscriber for a given timing of a particular communication of electronic marketing content. In particular, the marketing system can track, analyze, or otherwise determine the interactions with respect to marketing content associated with the subscriber. The marketing system can then plug the identified interactions into the un-subscription model to determine the subscription score for the user. Then based on the un-subscription score for the user, the marketing system can decide when, how, and if to provide the particular communication of electronic marketing content.

FIG. 1 is a schematic diagram illustrating an environment/system 100 in which a marketing system 102 can function in accordance with one or more embodiments. As illustrated in FIG. 1, the system 100 may include a marketing system 102 that communicates with client devices 104a, 104b, 104c over a network 108. Although FIG. 1 illustrates a particular arrangement of client devices 104a-c, the system 100 can include alternative configurations. For example, one or more of the client devices 104a-c may directly communicate with the marketing system 102 by passing the network 108.

Further, the system 100 can include any number of users/potential customers 106a, 106b, 106c associated with corresponding client devices 104a-c. In particular, the system 100 can include subscribers or un-subscribers that have, at one point or another, subscribed to receive electronic marketing content from the marketing system 102. For example, each of the users 106a-c may represent a user of a client device who has communicated an interest to the marketing system 102 to receive digital marketing content via email, text, instant message, or another electronic communication medium. Further, the users 106a-c may include any number of users that are actively subscribed to receive electronic marketing content from the marketing system 102 in addition to any number of users that have un-subscribed from receiving electronic marketing content from the marketing system 102. Thus, as used herein, a user 106a-c may refer to any previously subscribed user, including users that are currently subscribed to receive electronic marketing content as well as users that have un-subscribed from receiving electronic marketing content.

While FIG. 1 illustrates only a few client devices 104a-c and corresponding users 106a-c, the system 100 can include any number of client devices and corresponding users. Further, the marketing system 102 can communicate with a user via one or multiple client devices. For example, a user 106a can communicate with the marketing system 102 by way of multiple client devices. Additionally, although FIG. 1 illustrates only one marketing system 102, the system 100 can include one or more additional marketing systems corresponding to different marketers, merchants, or individual users. As an example, multiple merchants may communicate with the client devices 104a-c by way of different marketing systems associated with respective merchants.

Furthermore, as shown in FIG. 1, in one or more embodiments, the users 106a-c can interact with the client devices 104a-c, respectively. In particular, the users 106a-c can use the client devices 104a-c to communicate with the marketing system 102. Examples of client devices 104a-c can include, but are not limited to, mobile devices (e.g., smartphones, tablets), laptops, desktops, or other type of computing device, such as those described below in connection with FIG. 9.

Additionally, as stated above, the marketing system 102 can communicate with the client devices 104a-c through the network 108. In one or more embodiments, the network 108 may include the Internet or World Wide Web. The network 108, nevertheless, various other types of networks that use various communication technology and protocols, such as a corporate intranet, a virtual private network (VPN), a local area network (LAN), a wireless local network (WLAN), a cellular network, a wide area network (WAN), a metropolitan area network (MAN), or a combination of two or more such networks. Additional networks and network features are described below in connection with FIG. 9.

As mentioned above, the marketing system 102 can communicate with any number of users 106a-c by way of respective client devices 104a-c. In particular, the marketing system 102 can provide electronic marketing content to the client devices 104a-c over the network 108. In some embodiments, the marketing system 102 may act as a marketing source from which the marketing content originates and is sent on behalf of a merchant, user, business, or other source. Alternatively, the marketing system 102 can perform one or more functions described herein and provide information (e.g., subscriber information, un-subscription information) to a marketing source to facilitate providing electronic marketing content to one or more client devices 104a-c. Nevertheless, as used herein, the marketing system 102 may refer to a marketing source, a system acting on behalf of a marketing source, or a system that provides additional information to a marketing source that provides electronic marketing content to client devices 104a-c.

In communicating with the one or more users 106a-c, the marketing system 102 can collect information associated with the users 106a-c and/or respective client devices 104a-c. For example, the marketing system 102 can gather, collect, or otherwise obtain information (e.g., subscriber information) associated with each of the users 106a-c, including a status (e.g., subscriber or un-subscriber) of various users 106a-c. The marketing system 102 can further identify one or more interactions with respect to marketing content associated with users 106a-c within the system 100. For example, the marketing system 102 can identify various characteristics and interactions associated with the subscribers and un-subscribers, communications between the users 106a-c and the marketing system 102, interactions of the users 106a-c with electronic marketing content, interactions of the users 106a-c with a website, and/or additional information associated with the users 106a-c and associated client devices 104a-c.

The marketing system 102 can further generate an un-subscription model that indicates a likelihood that a subscriber will un-subscribe from receiving electronic marketing content from the marketing system 102. In particular, the marketing system 102 can analyze and process subscriber information and interactions associated with various users 106a-c (e.g., subscribers and/or un-subscribers) and generate an un-subscription model for predicting whether a potential customer is prone to un-subscribe from receiving electronic marketing content based on interactions and corresponding behavior of subscribers and un-subscribers. For example, the marketing system 102 can determine whether a potential customer will un-subscribe from receiving electronic marketing content in response to receiving a communication (e.g., email, text, instant message) from the marketing system 102.

To illustrate, a first user 106a illustrated in FIG. 1 may represent a potential customer who has previously subscribed to receive electronic marketing content from the marketing system 102. The remaining users 106b-c may represent a combination of current subscribers and un-subscribers to the marketing system 102. The marketing system 102 can identify interactions associated with the first user 106a and calculate an un-subscription score for the first user 106a based on the identified interactions. Further, the marketing system 102 can use the un-subscription score to identify whether the first user 106a is prone to un-subscribe from receiving future communications from the marketing system 102 in response to receiving a communication from the marketing system 102. If the un-subscription score indicates a low likelihood that the first user 106*a* will respond to receiving a communication by un-subscribing, the marketing system 102 may send a communication including electronic marketing content to the first user 106*a*. Alternatively, if the un-subscription score indicates a high likelihood that the first user 106*a* will un-subscribe, the marketing system 102 may determine an alternative to providing the communication to the first user 106*a*.

Figure 2:
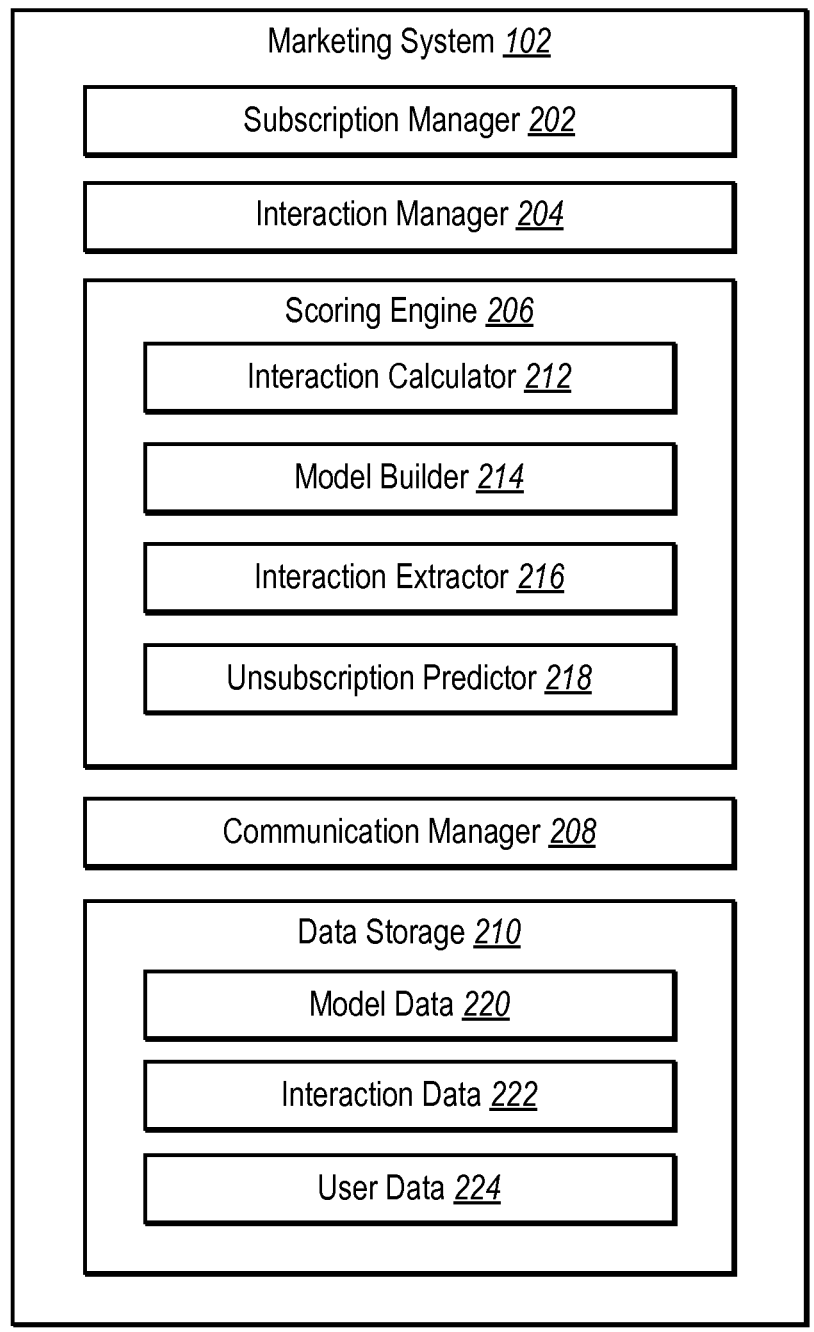
FIG. 2 illustrates a schematic diagram of the marketing system of FIG. 1 in accordance with one or more embodiments.

FIG. 2 illustrates a schematic diagram illustrating an example embodiment of the marketing system 102. In one or more embodiments, the marketing system 102 can include a subscription manager 202, an interaction manager 204, a scoring engine 206, a communication manager 208, and a data storage 210. Although the disclosure illustrated in FIG. 2 shows the components 202-210 to be separate, any of the components 202-210 may be combined into fewer components, such as into a single facility module, or divided into more components as may serve one or more embodiments. In addition, the components 202-210 may be located on, or implemented by, one or more servers or other computing devices, such as those described below in relation to FIG. 9.

The components 202-210 can comprise software, hardware, or both. For example, the components 202-210 can comprise one or more instructions stored on a computer readable storage medium and executable by a processor of one or more computer devices. When executed by the one or more processors, the computer-executable instructions of the marketing system 102 can cause a computing device(s) to perform the methods described herein. Alternatively, the components 202-210 can comprise hardware, such as a special-purpose processing device to perform a certain function. Additionally or alternatively, the components 202-210 can comprise a combination of computer-executable instructions and hardware.

In one or more embodiments, the marketing system 102 can perform various tasks that provide tools and services to one or more merchants and/or marketers. For example, the marketing system 102 can communicate over the network 108 with users 106*a-c* of a digital medium environment, such as an email system, instant messenger system, text messenger system, social networking system, or other digital environment and provide various types of electronic marketing content (e.g., marketing or advertising content) to the users 106*a-c* within the digital medium environment. In particular, the marketing system 102 can collect and analyze information associated with the users 106*a-c* and generate an un-subscription model based on interactions and characteristics of subscribers and un-subscribers within the system 100. Additionally, the marketing system 102 can identify interactions of a potential customer (e.g., a current subscriber) and determine whether the potential customer is prone to un-subscribe from receiving future communication from the marketing system 102. Using this information, the marketing system 102 can provide a tool for merchants or marketers to selectively provide electronic marketing content to one or more users 106*a-c* within the system 100.

In realizing features and functionality of the marketing system 102, a subscription manager 202 can manage information associated with users 106*a-c* (e.g., subscribers and un-subscribers) of a digital environment. In particular, the subscription manager 202 can gather subscriber information upon a user registering (e.g., subscribing) to receive electronic marketing content from the marketing system 102. Additionally or alternatively, the subscription manager 202 can gather subscriber information over time as the marketing system 102 communicates electronic marketing content to a subscriber and observes subscriber behavior in connection with electronic marketing content and/or a website/application associated with the marketing system 102. For example, the subscription manager 202 can collect and manage subscriber information, including a communication history, interaction history, and other information associated with one or more users 106*a-c*. In some embodiments, the subscription manager 202 can store subscriber information on the data storage 210 for later access by one or more components of the marketing system 102.

The marketing manager 202 can gather subscriber information using any number of tracking techniques. For example, the marketing system 102 can embed tracking pixels into electronic marketing content provided to a user. The tracking pixel can cause the user's client device to send a request to a web server associated with the marketing system 102. Based on the requests received at the web server, the marketing manager 202 can identify actions taken by the user. For example, upon a user opening an email from the marketer and a corresponding tracking pixel request, the marketing manager 202 can identify that the user opened the email.

Furthermore, the marketing manager 202 can identify subscriber information based on a subscriber or user profile. In particular, the marketing system 102 can maintain a user profile for each subscriber. The marketing system 102 can store past purchases for the user (whether via ecommerce applications or at brick and mortar stores), the frequency and recency of communications with the user, interests of the user, purchases of the user, items added by the user to an ecommerce cart, average time spent on a marketer's website, time since last purchase, number of pages viewed during each session, etc.

In addition to collecting, storing, and otherwise managing subscriber information, the subscription manager 202 can identify a status associated with one or more users 106*a-c* within a digital medium environment. In particular, the subscription manager 202 can identify current subscribers and un-subscribers from among a group of users 106*a-c* that have previously subscribed to receive electronic marketing content from the marketing system 102. In addition, the subscription manager 202 can identify or otherwise access information associated with each subscriber or un-subscriber within the system 100. In some embodiments, the subscription manager 202 can identify all current subscribers and all un-subscribers. Alternatively, the subscription manager 202 can identify a sample of subscribers and/or un-subscribers representative of a larger group of users.

As mentioned above, the marketing system 102 can further include an interaction manager 204 that identifies one or more interactions with regard to marketing content associated with subscribers and un-subscribers. In particular, the interaction manager 204 can extract interactions from subscriber information to identify one or more interactions associated with individual subscribers and/or un-subscribers with regard to marketing content from a marketing source. For example, the interaction manager 204 can extract interactions associated with a communication history of a user 106, a history of interactions of the user 106*a-c* with electronic marketing content, a history of interactions of the user 106*a-c* with a website associated with the marketing system 102, and/or additional information about the user. In some embodiments, the interaction manager 204 can specifically identify interactions associated with un-subscribers. Additionally or alternatively, the interaction manager 204 can identify interactions associated with current subscribers.

As mentioned above, the marketing system 102 can further include a scoring engine 206. As illustrated in FIG. 2, the scoring engine 206 can include an interaction calculator 212, an un-subscription model builder 214, an interaction extractor 216, and an un-subscription predictor 218. In particular, the interaction calculator 212 and the un-subscription model builder 214 can analyze subscriber information and generate an un-subscription model. Further, the interaction extractor 216 and un-subscription predictor 218 can apply results of the un-subscription model to predict whether a potential customer associated with a particular set of interaction will un-subscribe from receiving electronic marketing content under various circumstances.

In generating an un-subscription model, the interaction calculator 212 can identify corresponding interactions of subscribers and un-subscribers and determine interactions or characteristics indicative of a subscription status of the subscribers or un-subscribers. In particular, where the interaction manager 204 has identified interactions of un-subscribers, the interaction calculator 212 can identify individual interactions and/or combinations of interactions that the un-subscribers have in common. For example, where the majority of un-subscribers are associated with a common interaction, the interaction calculator 212 may determine that the common interaction indicates that a potential customer associated with a similar interaction is prone to un-subscribe from receiving electronic marketing content from the marketing system 102. Additionally or alternatively, the interaction manager 204 can identify one or more interactions that differ between un-subscribers and current subscribers and determine that an interaction that is common among subscribers and uncommon among un-subscribers indicates that a potential customer associated with a similar interaction is less prone to un-subscribe from receiving electronic marketing content from the marketing system 102.

Additionally, the interaction calculator 212 can identify a weight or other value associated with individual interactions or combinations of interactions that indicate an importance of one or more interactions in determining whether a potential customer will un-subscribe from receiving electronic marketing content. In particular, where a particular interaction with regard to marketing content has a strong correlation with un-subscribers, the marketing system 102 can identify that interaction as having a high level of importance and associate a high weight with that interaction or combination of interactions. As an example, where most un-subscribers rarely open received emails that are received from a marketing source and most subscribers frequently open emails that are received from the marketing source, the marketing system 102 can associate a value with the rate of opening received emails that indicates that a potential customer who rarely opens emails from a marketing source is more prone to un-subscribe than a potential customer that frequently opens emails from the marketing source.

Additionally, as mentioned above, the scoring engine 206 can include an un-subscription model builder 214 that generates an un-subscription model to indicate whether a user 106a-c is likely to un-subscribe from receiving electronic marketing content from the marketing system 102. In particular, the un-subscription model builder 214 can use the interactions and associated values to build an un-subscription model that predicts whether a potential customer having a particular set of interactions with regard to marketing content will un-subscribe from receiving electronic marketing content from the marketing system 102. For example, the scoring engine 206 can generate a formula including values for one or more interactions that identifies whether a user 106a-c associated with the set of interactions has un-subscribed from receiving electronic marketing content from the marketing system 102.

The un-subscription model builder 214 can use various prediction un-subscription models in predicting the probabilities that users 106a-c will un-subscribe from receiving electronic marketing content from the marketing system 102. For example, the un-subscription model builder 214 can estimate un-subscription probabilities using a logistic regression. In the logistic regression, the probability that a user 106a-c will un-subscribe from receiving electronic marketing content is determined to be a function of interactions and values/weights associated with respective interactions. For example, the equation below provides an example in which logistic regression may be used to calculate a probability (P) that a potential customer having a set of X interactions will un-subscribe from receiving electronic marketing content, where x represents one or a combination of interactions and $\beta_x$ represents a value or constant associated with a respective interactions or combination of interactions.

$$P(\text{Unsubscribe} \mid X = x) = \frac{\exp(\beta_0 + \beta_1 x_1 + \beta_2 x_2 + \ldots + \beta_k x_k)}{1 + \exp(\beta_0 + \beta_1 x_1 + \beta_2 x_2 + \ldots + \beta_k x_k)}$$

Additionally or alternatively, some embodiments of the un-subscription model builder 214 can use other methods to predict whether a potential customer will un-subscribe from receiving electronic marketing content. For example, the un-subscription model builder 214 can utilize a random forest classification method in which the un-subscription model builder 214 constructs a network of decision trees that provide a collection of marketing interaction-based decisions to determine whether a user 106a-c is likely to un-subscribe from receiving electronic marketing content from the marketing system 102. In some embodiments, the un-subscription model builder 214 can consider an average of marketing interaction-based decisions of the decision trees to arrive at a cumulative answer that predicts whether a user 106a-c will un-subscribe from receiving electronic marketing content. Further, in some embodiments, the un-subscription model builder 214 can consider a sequence of marketing interaction-based decisions that bypass consideration of one or more un-related interactions to arrive at a prediction of whether a user 106a-c will un-subscribe. Additionally, some embodiments may implement weighted marketing interaction values in determining whether a user 106a-c will un-subscribe from receiving electronic marketing content.

In another example, the un-subscription model builder 214 can utilize one or more artificial neural networks that capture a variety of functional relationships between predictor and target variables. In particular, the un-subscription model builder 214 may implement the artificial neural networks in connection with one or more additional predictive un-subscription models to provide further accuracy and useful data in predicting whether potential customers will un-subscribe from receiving electronic marketing content from the marketing system 102. The artificial neural network may facilitate identifying a strength of relationships between different interactions with respect to marketing content to provide an accurate prediction of whether an interaction or set of interactions are indicative of a user 106a-c who is prone to un-subscribe from receiving electronic marketing content from the marketing system 102.

In another example, the un-subscription model builder 214 can utilize linear discriminant analysis in generating an un-subscription model. In particular, the un-subscription model builder 214 can express one or more variables (e.g., interactions) as a linear combination of other interaction values and predict, based on the linear combination, whether a user 106a-c associated with a particular set of interactions will un-subscribe from receiving electronic marketing content. In some embodiments, the un-subscription model builder 214 can implement linear discriminant analysis upon identifying that various interactions are normally distributed among a sample of users 106a-c within the system 100.

In another example, the un-subscription model builder 214 can use a nearest neighbor method to predict whether a potential customer associated with a particular set of interactions will un-subscribe. In particular, the un-subscription model builder 214 can consider one or more interactions within a neighborhood of close or related interactions and assign values for various interactions based on the interaction relationships. For example, the un-subscription model builder 214 can associate one or more interactions with nearby interactions within a decision tree and apply a weight function to one or more interactions to predict a likelihood that a set of interactions is indicative of an un-subscriber. Similar to other prediction un-subscription models described herein, un-subscription model builder 214 can use a nearest neighbor method in conjunction with other prediction methods (e.g., random forest method, linear discriminant analysis).

As mentioned above, the scoring engine 206 can further include an interaction extractor 216 that identifies interactions associated with a potential customer. In particular, in determining whether to send a communication to a potential customer that currently subscribes to receiving electronic marketing content, the interaction extractor 216 can extract a set of interactions pertaining to the potential customer prior to sending the communication to a client device 104a associated with the user 106a. As an example, in determining whether to send electronic marketing content to a first user 106a, the interaction extractor 216 can first identify a set of interactions associated with the user 106a, such as a frequency with which emails have been previously sent to the user 106a, a history of emails and other messages provided to the user 106a, a history of interactions by the user 106a with previous communications, and/or a history of interactions by the user 106a with a website associated with the marketing system 102. In some embodiments, the interaction extractor 216 can identify interactions by accessing the data storage 210 or other storage accessible to the marketing system 102.

The scoring engine 206 can further include an un-subscription predictor 218 that identifies whether a potential subscriber is prone to un-subscribe from receiving electronic marketing content from the marketing system 102. In particular, the un-subscription predictor 218 can calculate a score (e.g., a likelihood or probability) based on one or more identified interactions with respect to marketing content associated with the potential customer. For example, the un-subscription predictor 218 can compute an un-subscription score associated with the potential customer using interaction values and prediction methods implemented by one or more un-subscription models generated by the un-subscription model builder 214.

Upon calculating the un-subscription score for a potential customer, the un-subscription predictor 218 can further determine whether the potential customer will un-subscribe from receiving electronic marketing content from the marketing system 102. For example, the un-subscription predictor 218 can determine whether the un-subscription score associated with the potential customer exceeds a threshold un-subscription score that indicates a propensity of the potential customer to un-subscribe from receiving electronic marketing content. In particular, the un-subscription predictor 218 can determine that sending a communication to the potential customer will likely trigger the potential customer to un-subscribe from receiving electronic marketing content from the marketing system 102 in the future.

As mentioned above, the marketing system 102 can further include a communication manager 208 that manages communication between the marketing system 102 and client devices 104a-c over the network 108. In particular, the communication manager 208 can facilitate delivery of electronic marketing content to a user 106a-c using a variety of communication types. For example, the communication manager 208 can deliver electronic marketing content to a user 106a-c via email, text message, instant message, social networking communication, or other communication scheme.

Additionally, the communication manager 208 can determine whether to send electronic marketing content to a potential customer based on an un-subscription score associated with the potential customer. In particular, where the un-subscription score indicates that the potential customer is prone to un-subscribe from receiving electronic marketing content, the communication manager 208 may determine not to send a communication to the potential customer for a predefined period of time. Alternatively, rather than delaying sending additional electronic marketing content, the communication manager 208 may determine an alternative to sending a particular communication to the potential customer.

Furthermore, as mentioned above, and as illustrated in FIG. 2, the marketing system 102 can include a data storage 210 including un-subscription model data 220, interaction data 222, and user data 224. In particular, the un-subscription model data 220 may represent information associated with various types of un-subscription models for use in predicting a propensity of a potential customer to un-subscribe from receiving electronic marketing content from the marketing system 102. Additionally, the interaction data 222 may represent information associated with interactions of individual users and/or scores associated with different interactions or combinations of interactions. Furthermore, the user data 224 may represent any information associated with users 106a-c. For example, user data 224 may include historical information associated with a user and/or whether users 106a-c are currently subscribers or un-subscribers.

Figure 3:
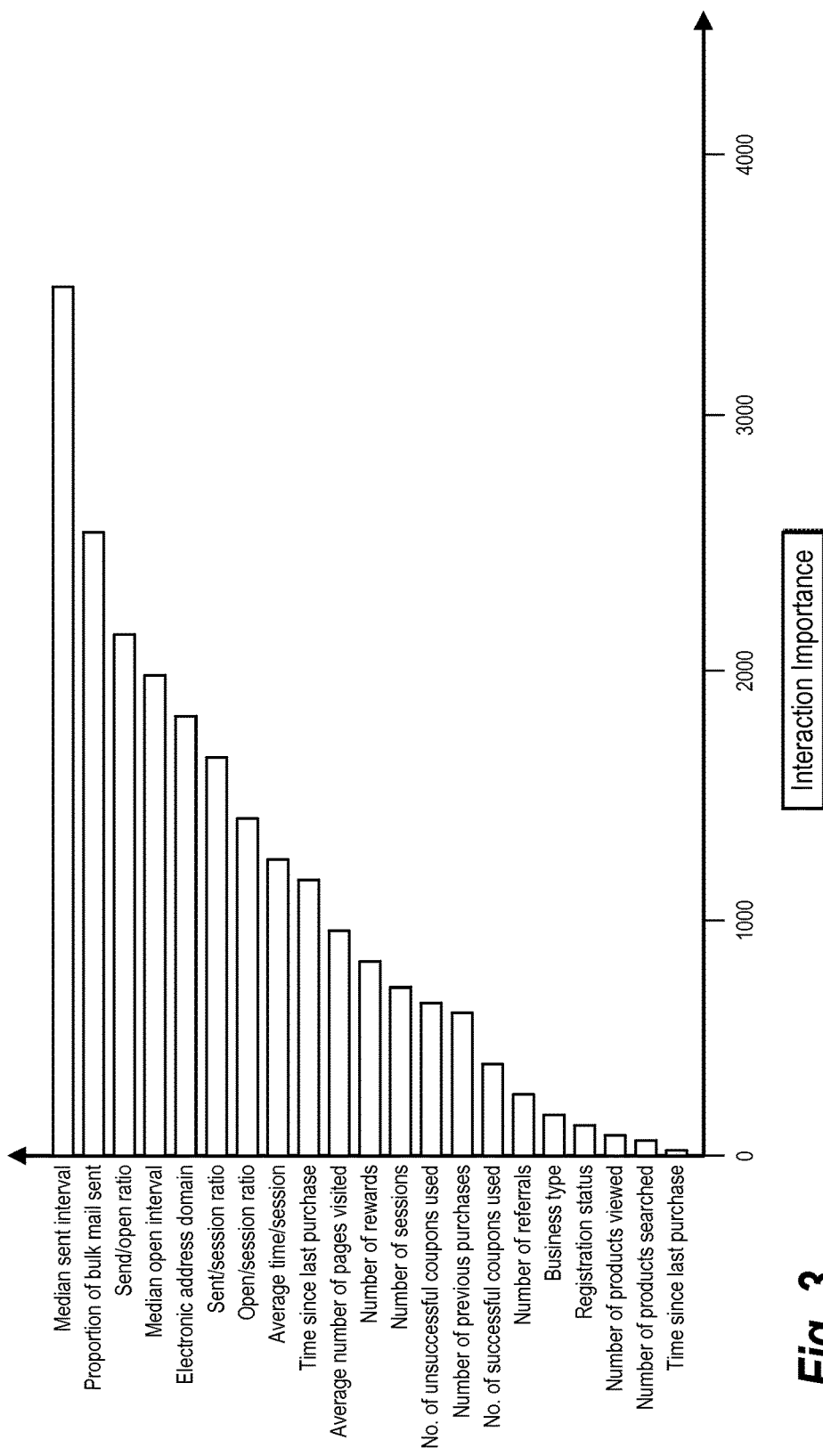
FIG. 3 illustrates a graph indicating various levels of importance associated with different interactions and features in accordance with one or more embodiments.

As described above, the marketing system 102 can identify current subscribers and non-subscribers among a group of users 106a-c and further identify interactions with respect to marketing content associated with the various users 106a-c. In particular, as illustrated in FIG. 3, the marketing system 102 can identify one or more interactions and associate a value, weight, or measure of importance of the interactions with regard to whether a potential customer will un-subscribe from receiving electronic marketing content from the marketing system 102. One or more examples of various interactions will be described in further detail below.

As illustrated in FIG. 3, the marketing system 102 may consider various types of interactions in generating an un-subscription model and further determining whether a potential customer will un-subscribe from receiving electronic marketing content from the marketing system 102. In addition, while not every interaction or type of interaction need be considered for each user in generating an un-subscription model or determining whether a potential customer will un-subscribe, the marketing system 102 may consider any number of interactions associated with a particular user in performing various functions described herein.

For example, as illustrated in FIG. 3, one or more interactions may include characteristics or features associated with a communication history of a group of users 106*a-c*. In particular, the marketing system 102 can observe, track, and store information associated with a history of communications between the marketing system 102 and users 106*a-c*. For example, as shown in FIG. 3, interactions related to a communication history of a user may include a median sent interval, a proportion of bulk mails sent, a number of referrals, and a registration status of the user. In particular, the median sent interval may refer to a median or average frequency with which the marketing system 102 has sent communications to a user. Further, the proportion of bulk mails sent may refer to a percentage of communications from the marketing system 102 to the user that include bulk mail. Further, the number of referrals may refer to a number of other users that the user 106*a-c* has referred to receive electronic marketing content from the marketing system 102. Additionally, the registration status may refer to whether the user has formally registered or has otherwise communicated a desire to subscribe to receive electronic marketing content from the marketing system 102.

Furthermore, as illustrated in FIG. 3, one or more interactions may include characteristics or features associated with an interaction history of the user with respect to electronic marketing content received from the marketing system 102. In particular, the marketing system 102 can observe, track, and store a history of interactions between the user and the electronic marketing content. For example, as shown in FIG. 3, interactions related to an interaction history with the electronic marketing content may include a sent to open ratio and a median open interval. In particular, the sent to open ratio may refer to a percentage or ratio of communications sent to the user that the user opens rather than deletes, discards or otherwise ignores. Additionally, the median open interval may refer to a median or average time that a user opens and views or otherwise interacts with electronic marketing content received from the marketing system 102.

Furthermore, as illustrated in FIG. 3, one or more interactions may include characteristics associated with an interaction history of users 106*a-c* with a website associated with the electronic marketing content and/or marketing system 102. In particular, the marketing system 102 can observe, track, and store information associated with sessions and interactions by a user with a website associated with the marketing system 102. In some embodiments, the marketing system 102 may track interactions of the user with a website pursuant to following a link from within received electronic marketing content that links to the website. Additionally or alternatively, the marketing system 102 may track interactions of the user whenever the user visits the website.

As illustrated in FIG. 3, the marketing system 102 may identify various interactions associated with interactions of users 106*a-c* with a website. For example, as shown in FIG. 3, an interaction may include a sent to session ratio associated with a ratio between a number of sent communications and a number of sessions with the webpage. To illustrate, this sent to session ratio may refer to a percentage or proportion of emails received by the user (e.g., opened and un-opened emails) and a number of times that the user navigates to the website. In a further example, an interaction may include an open to session ratio associated with a ratio between a number of opened emails and a number of sessions with the webpage. For instance, this open to session ratio may refer to a percentage or proportion of emails that the user has opened and subsequently navigated to the website.

As illustrated in FIG. 3, other interactions related to website interaction may include a metric of time or number of interactions with the website. For example, as shown in FIG. 3, an interaction may include an average time per session spent by a user 106*a-c* on the website. Further, an interaction may include an indication of total time spent by the user 106*a-c* on the website. In another example, an interaction may include an average number of pages visited within the website within a single session or over time. Another example of an interaction may include a number of sessions by the user (e.g., an average or number over a defined period of time).

Additionally, as illustrated in FIG. 3, other interactions related to website interactions may include interactions that relate to specific actions and specific products on the website. For example, as shown in FIG. 3, an interaction may include a number of successful coupons or number of unsuccessful coupons applied by the user on the website. Another example interaction may include a number of products or identification of products purchased by the user 106*a-c* (e.g., using the website). Additionally, an interaction may include a number of products views based on an identification of one or more products viewed or a number of products viewed by the user on the website, including purchased and not purchased products. Further, an interaction may include a number of products searched by the user using the website. While not illustrated in FIG. 3, other interactions may relate to other website interactions. For example, an interaction may include a number of products added to a shopping cart and/or a number of abandoned products left in a shopping cart.

Furthermore, as illustrated in FIG. 3, the marketing system 102 may identify and categorize other interactions associated with a user that are not necessarily related to communications with the user 106*a*, interactions of the user with electronic marketing content, or interactions of the user with a website. For example, as illustrated in FIG. 3, an interaction may include an electronic address domain associated with a user. For example, the electronic address domain may include an indication of an email domain, an email address, text message address, instant messenger address, or an identification of a particular social networking system used by the user 106*a* in communicating with the marketing system 102. Another interaction may include a time since the last purchase of the user 106*a*. Another interaction may include a number of rewards used or otherwise associated with the user 106*a*. Another interaction may include a business type associated with the user 106*a* or other organization.

Additionally, as shown in FIG. 3, each of the interactions may have an associated importance value or weight. To illustrate, in the example of FIG. 3, each of the interactions are listed in descending order, with the interaction of "median sent interval" having the highest importance relative to other interactions in determining whether a potential customer has a propensity to un-subscribe from receiving electronic marketing content from the marketing system 102. Other embodiments may include a different order of importance associated with different interactions.

In identifying the importance values or weights, the marketing system 102 may identify the strength of correlation between interactions of users 106a-c and a subscription status associated with different users. For example, the marketing system 102 may determine that the most common interaction among un-subscribers is that the un-subscribers received emails from the marketing system at a higher frequency than those users that have not un-subscribed. Additionally, the marketing system 102 may determine that a high percentage of users that have un-subscribed do not open very many emails relative to the number of emails received. Thus, in this example, the marketing system 102 may associate a high level of importance with a frequency of emails sent to the users and a ratio of sent and opened emails in determining whether a potential customer associated with similar interactions will un-subscribe from receiving emails (or other communications) from the marketing system 102.

Additionally or alternatively, the marketing system 102 can weight interactions based on which action/behavior/interaction was just prior to a subscriber un-subscribing. For example, the marketing system 102 can identify that subscribers rarely un-subscribe after receiving receipt emails. Thus, the marketing system 102 can associate a small weight with the receipt emails. In contrast, the marketing system 102 can identify that subscribers often unsubscribe to generic bulk emails. A such, the marketing system 102 can associated a larger weight with bulk emails.

In addition to determining an importance of different interactions, the marketing system 102 may incorporate the importance of different interactions in determining whether a potential customer will un-subscribe from receiving electronic marketing content. In particular, the marketing system 102 may weight scores associated with more important interactions more heavily than scores associated with less important interactions. For example, as shown in FIG. 3, two of the most important interactions may include a median sent time interval and a proportion of bulk mail sent. Thus, a potential customer that receives a high frequency of mostly bulk email may have a high propensity to un-subscribe notwithstanding one or more additional interactions that would indicate that the user is unlikely to un-subscribe. Alternatively, another potential customer that receives a low frequency of mostly non-bulk email may have a low propensity to un-subscribe notwithstanding one or more additional interactions that correspond to a high propensity of the potential customer to un-subscribe. In some embodiments, each interaction may have a specific value that differs based on an importance associated with each respective interactions.

More particular, the marketing system 102 can identify a comparative effect of each of the interactions on the likelihood that the one or more potential customers will un-subscribe. The marketing system 102 can associate a weight with each of the interactions based on the identified comparative effects. Thus, interactions that have a comparatively large effect on users un-subscribing, can be given a larger weight. While features that have a comparatively small effect on users un-subscribing, can be given a smaller weight.

As described above, in addition to identifying interactions, correlations, and other information, the marketing system 102 can generate an un-subscription model that indicates whether a potential customer having a particular set of interactions will un-subscribe from receiving electronic marketing content from the marketing system 102. Further, the marketing system 102 may use a variety of prediction and probability un-subscription models to generate the un-subscription model. Moreover, the marketing system 102 may use a combination of different un-subscription models in generating the un-subscription model and predicting whether a potential user will un-subscribe in response to receiving one or more communications from the marketing system 102 within a certain period of time.

Additionally, as described above, the marketing system 102 may use the interactions and associated values to determine whether to send a communication to a potential customer having particular set of interactions. In particular, the marketing system 102 may determine a threshold value that indicates a threshold above which an un-subscription score indicates a high probability of un-subscription. Alternatively, an un-subscription score below the threshold value may indicate a low probability of un-subscription. In some embodiments, the marketing system 102 may determine multiple threshold values that indicate different regions or ranges of values associated with different probabilities that a potential customer will un-subscribe from receiving electronic marketing content.

Further, with regard to one or more un-subscription models, the marketing system 102 may determine a projected accuracy associated with one or more un-subscription models using a lift chart. In particular, while each un-subscription model may identify trends of interactions with respect to marketing content associated with un-subscribers and further identifying potential customers that are prone to un-subscribe based on those interactions, a lift chart may provide further guidance in determining the threshold un-subscription value. For example, as shown in FIG. 4, the marketing system 102 may generate a lift chart 402 that indicates an accuracy of an un-subscription model and further indicates an estimated rate or percentage of un-subscribers within a sample of users 106a-c that will be identified using a particular un-subscription model.

In generating the lift chart 402, the marketing system 102 may sample a group of users 106a-c and identify un-subscribers and/or subscribers among the group of users 106a-c. The marketing system 102 may further identify interactions and associated weights for subscribers and un-subscribers. Using one or more of the un-subscription models described above, the marketing system 102 can further identify a trend of interactions associated with subscribers and un-subscribers and particularly identify one or more interactions that correspond with a subscription status of subscribers and un-subscribers. As illustrated in FIG. 4, the marketing system 102 can then generate a lift chart 402 that illustrates the un-subscription results of the sample of users 106a-c.

Figure 4:
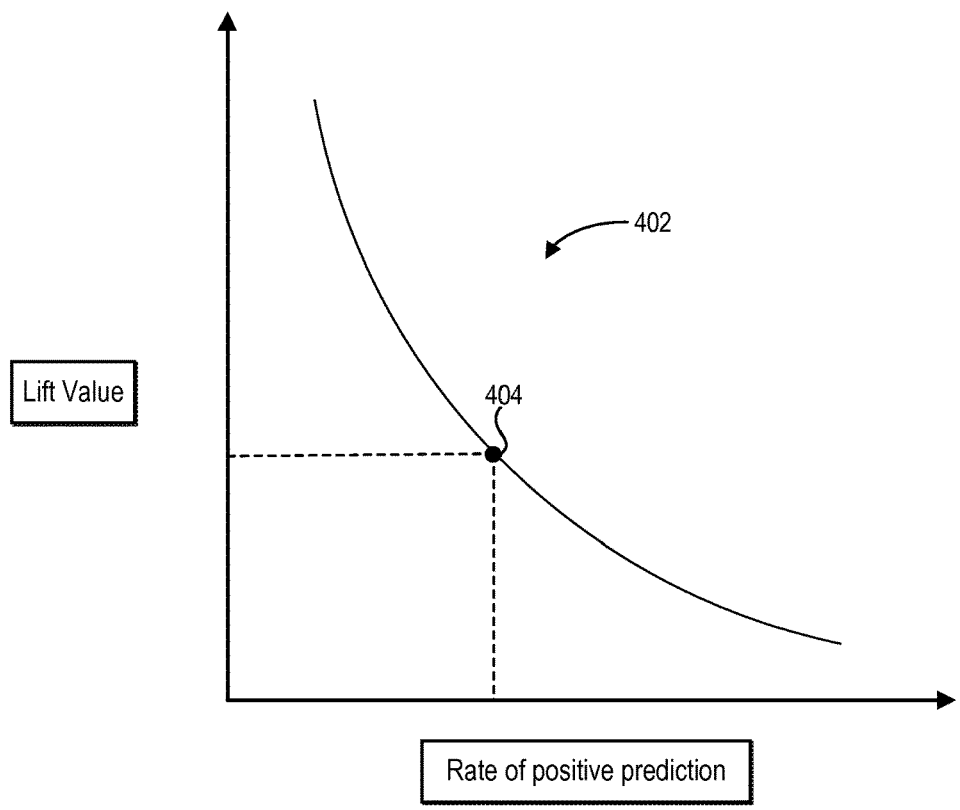
FIG. 4 illustrates an example lift curve for determining a projected accuracy of a prediction un-subscription model in accordance with one or more embodiments.

For example, as shown in FIG. 4, the lift chart 402 illustrates a rate that an un-subscription model will positively predict that users 106a-c having a particular un-subscription score have un-subscribed from receiving electronic marketing content. In particular, the un-subscription model has a high probability of predicting un-subscription for users 106a-c having a high un-subscription score and a low probability of predicting un-subscription for users 106a-c having a low un-subscription score. Further, as indicated in FIG. 4, the lift chart 402 can provide a specific lift value that indicates across a spectrum of un-subscription scores an accuracy of the un-subscription model relative to predicting un-subscription of random users without the un-subscription model. As such, the lift chart 402 may provide an indication of accuracy for an un-subscription model across different un-subscription scores.

Furthermore, as illustrated in FIG. 4, the marketing system 102 can identify a cut-off point 404 associated with a threshold un-subscription score. In particular, the cut-off point 404 can indicate an un-subscription score or a range of un-subscription scores associated with the largest difference between randomly guessing whether a potential customer associated with a particular un-subscription score will un-subscribe and predicting whether the potential customer will un-subscribe using the un-subscription model. Alternatively, in some embodiments, the cut-off point 404 may indicate an un-subscription score that captures a certain percentage of un-subscribers using the un-subscription model.

To illustrate, the cut-off point 404 may indicate an un-subscription score above which 75% of un-subscribers will fall when using a particular un-subscription model. As such, the marketing system 102 may determine a threshold un-subscription score to avoid causing un-subscription of 75% potential customers that would un-subscribe in response to receiving a communication from the marketing system 102. Thus, the marketing system 102 may prevent at least a portion of 75% of would-be un-subscribers by setting the threshold un-subscription value in accordance with the cut-off value 404 of the lift chart 402. In some embodiments, the marketing system 102 can identify multiple cut-off points to identify different threshold scores associated with different percentages of users 106a-c and/or different levels of accuracy of the un-subscription model(s).

Figure 5:
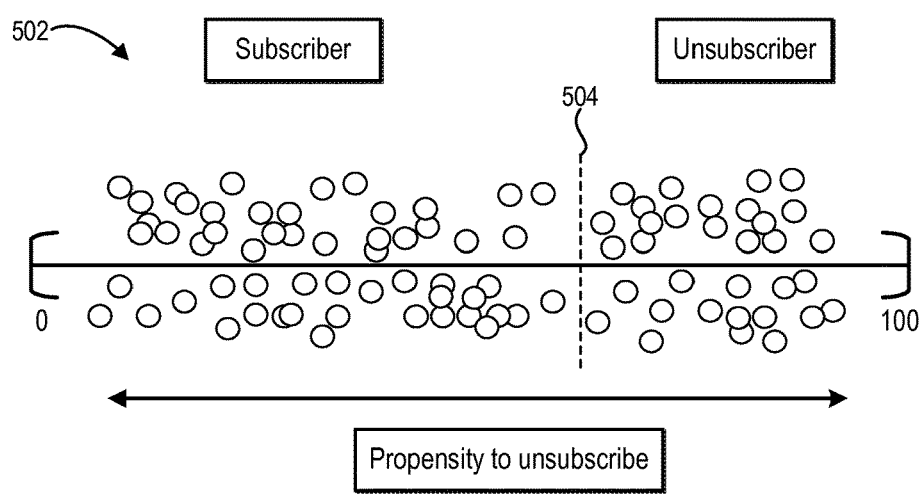
FIG. 5 illustrates an example graphical representation showing a likelihood that potential customers will unsubscribe from receiving electronic marketing content from a marketing system in accordance with one or more embodiments.

As mentioned above, the marketing system 102 may analyze interactions with respect to marketing content associated with a potential customer and determine whether sending a communication to the potential customer will trigger the potential customer to un-subscribe from receiving electronic marketing content. To illustrate, FIG. 5 provides a sample plot of sun-subscription cores 502 associated with a group of users 106a-c including subscribers and un-subscribers. In particular, FIG. 5 provides a plot of un-subscription scores 502 based on interactions associated with users 106a-c.

Additionally, as shown in FIG. 5, the plot of scores 502 may include a threshold value 504 that indicates a threshold un-subscription value along the plot of scores. In particular, in the illustrated example of FIG. 5, the un-subscription scores on the un-subscription side of the threshold value 504 indicate users that are more likely to un-subscribe to receive electronic marketing content from the marketing system 102 than those users associated with the scores on the subscription side of the threshold value 504. Alternatively, while not shown in FIG. 5, the plot of scores 502 may include multiple threshold values that define different regions within the plot associated with different probabilities that users within those regions will un-subscribe from receiving electronic marketing content.

The marketing system 102 can use the un-subscription model and resulting plot of scores to determine whether a score for a potential customer exceeds the threshold value. For example, the marketing system 102 can extract interactions with respect to marketing content associated with the potential customer and calculate an un-subscription score based on the extracted interactions. The marketing system 102 can further determine whether the un-subscription score exceeds the threshold value 504 in a variety of ways. For example, the marketing system 102 may calculate an un-subscription score for a potential customer and determine whether the un-subscription score exceeds the threshold value 504 placing the potential customer on an un-subscriber side of the threshold value 504. Alternatively, the marketing system 102 may determine whether the un-subscription score for the potential customer places the potential customer within a percentile of users that falls on the un-subscriber side of the threshold value 504.

In addition to comparing an un-subscription score for a potential customer with the threshold value 504, the marketing system 102 can determine an appropriate action to take in connection with the potential customer based on whether the un-subscription score exceeds the threshold value 504. For example, if the un-subscription score falls on a subscriber side of the threshold value 504, the marketing system 102 may send a communication to the potential customer because the potential customer is unlikely to respond to the communication by un-subscribing. Alternatively, if the un-subscription score falls on an un-subscriber side of threshold value 504, the marketing system 102 may determine an alternative action to providing a communication to the potential customer. For example, the marketing system 102 may delay sending the communication to the potential customer until a future date. In another example, the marketing system 102 may determine an alternative communication platform for sending electronic marketing content to the potential customer (e.g., text rather than email, or social media message rather than instant message).

In some embodiments, the marketing system 102 may consider whether a potential customer will un-subscribe from receiving electronic marketing content in connection with one or more additional actions by the potential customer. For example, the marketing system 102 may further consider whether a potential customer will likely revisit an abandoned shopping cart, respond to a product campaign, respond to an email offer, participate in a survey, or otherwise respond to receiving sale information or new product launch information.

Figure 6:
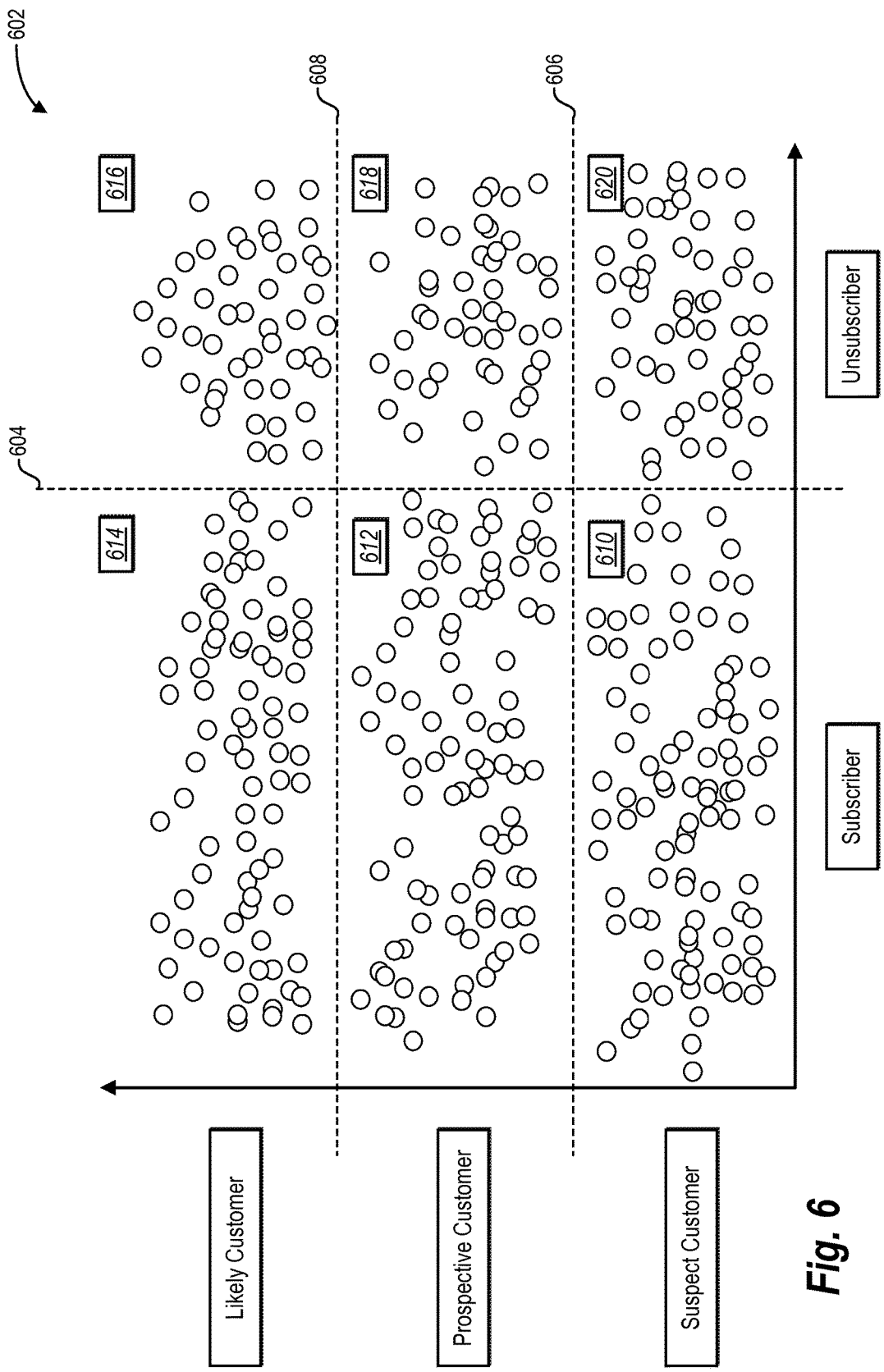
FIG. 6 illustrates another example graphical representation showing a likelihood that potential customers will unsubscribe from receiving electronic marketing content from a marketing system in accordance with one or more embodiments.

For example, FIG. 6 illustrates a plot of points that represent un-subscription scores and purchase scores for a group of users 106a-c. In particular, in the example illustrated in FIG. 6, a position of each point along the x-axis corresponds to an un-subscription score associated with a respective user. Additionally, a position of each point along the y-axis corresponds to a purchase score associated with a respective user. More specifically, as illustrated in FIG. 6, the purchase score may correspond to a likelihood that a user will revisit an abandoned cart and/or purchase an item left on the abandoned cart. For example, the purchase score may represent a probability that a user who has previously visited a website and placed a product in a shopping cart will return on their own (or in response to receiving a reminder email) to purchase product left in the abandoned shopping cart.

The marketing system 102 (or other system) may determine the likelihood associated with returning to the abandoned shopping cart using a variety of methods and/or prediction un-subscription models. For example, the marketing system 102 may determine the likelihood of a potential customer returning to the abandoned shopping cart using one or more of the un-subscription models described above in connection with the un-subscription score and predicting un-subscription of a potential customer. Alternatively, other methods and/or prediction un-subscription models may be used in predicting whether a user will return to an abandoned shopping cart. Additionally, similar to other methods described herein, the marketing system 102 may determine or otherwise identify one or more threshold values associated with different probabilities that a potential customer will return to an abandoned shopping cart.

In some embodiments, the marketing system 102 may consider both the probability that a potential customer will un-subscribe from receiving electronic marketing content in addition to considering a probability that the potential customer will return to an abandoned shopping cart in determining whether to send a communication to the potential customer. For example, the marketing system 102 may determine that a user is likely to return to an abandoned shopping cart with or without receiving a reminder email. As such, the marketing system 102 may determine that sending a reminder email to the potential customer would be ineffective and result in an unnecessary risk of the potential customer un-subscribing from the marketing system 102. In another example, the marketing system 102 may determine that a user is unlikely to return to an abandoned shopping cart without receiving a reminder email, and thus determine that sending a reminder email to the potential customer would be effective enough to merit sending the email. In some cases, the marketing system 102 may determine that the potential efficacy of sending the email would outweigh a certain level of risk that the potential customer will un-subscribe from receiving future communications.

To illustrate, FIG. 6 includes a plot of points 602 that fall within six different regions defined by various threshold values. For example, as shown in FIG. 6, the plot of points 602 may include a threshold un-subscription value 604, a first threshold purchase value 606, and a second threshold purchase value 608. Further, as shown in FIG. 6, a first region 610 includes un-subscription scores that fall below the threshold un-subscription value 604 and purchase scores that fall below the first threshold purchase value 606. A second region 612 includes un-subscription scores that fall below the threshold un-subscription value 604 and purchase scores that fall between the first threshold purchase value 606 and the second threshold purchase value 608. A third region 614 includes un-subscription scores that fall below the threshold un-subscription value 604 and purchase scores that fall above the second threshold purchase value 608. A fourth region 616 includes un-subscription scores above the threshold un-subscription value 604 and purchase scores above the second threshold purchase value 608. A fifth region 618 includes un-subscription scores above the threshold un-subscription value 604 and purchase scores between the first threshold purchase value 606 and the second threshold purchase value 608. A sixth region 620 includes un-subscription scores above the threshold un-subscription value 604 and purchase scores below the first threshold purchase value 606.

Thus, the first region 610 represents users that are less likely to un-subscribe and least likely to return to an abandoned shopping cart. As such, the marketing system 102 may determine that sending an email to a potential customer that falls within the first region 610 presents a minimal risk of un-subscription and a large potential reward. In particular, sending a reminder email may result in a potential customer returning to an abandoned shopping cart that would not have returned to the shopping cart otherwise.

The marketing system 102 may perform a similar analysis for each region in determining whether to send a reminder email to a potential customer of an abandoned shopping cart. For example, the marketing system 102 may similarly determine that sending a reminder email to a potential customer that falls within the second region 612 poses a minimum risk of un-subscription and a promising reward. In particular, sending a reminder email may result in a higher likelihood that a potential customer will return to an abandoned shopping cart without risking that the potential customer will un-subscribe from receiving future emails.

With regard to the third region 614, the marketing system 102 may determine that a potential customer that falls within the third region 614 is likely to return to an abandoned shopping cart with or without receiving a reminder email. Thus, the marketing system 102 may determine that the risk of un-subscription in response to receiving a reminder email outweighs the risk of sending the reminder email to the potential customer, as the potential customer is likely to return to the abandoned shopping cart without also receiving a reminder email. Similarly, the marketing system 102 may determine that sending an email to a potential customer in the fourth region 616 would pose an un-necessary risk or un-subscription, particularly because the potential customer is already prone to un-subscribe from receiving emails, and because the potential customer is already likely to return to the abandoned shopping cart.

With regard to the fifth region 618, the marketing system 102 may determine that it would be useful to send a reminder email, but determine that sending a reminder email poses a risk that the potential customer will un-subscribe from receiving future emails. In some embodiments, the marketing system 102 may nonetheless determine that the potential benefits outweigh the potential risk of un-subscription. Alternatively, the marketing system 102 may determine an alternative to sending the reminder email to the potential customer. For example, the marketing system 102 may determine an alternative communication channel for reminding the potential customer about the abandoned shopping cart. Alternatively, the marketing system 102 may wait a period of time until the potential customer becomes less of an un-subscription risk.

With regard to the sixth region 620, the marketing system 102 may determine that a potential customer that falls within the sixth region 620 is both prone to un-subscribe in response to receiving a reminder email and that sending a reminder email is not likely to result in the potential customer re-visiting an abandoned shopping cart. As such, the marketing system 102 may avoid sending a reminder email about the abandoned shopping cart. Nonetheless, to preserve the potential customer as a subscriber, the marketing system 102 may continue sending emails including other electronic marketing content at different times. Alternatively, the marketing system 102 may determine alternative ways to communicate electronic marketing content to potential customer.

Figure 7:
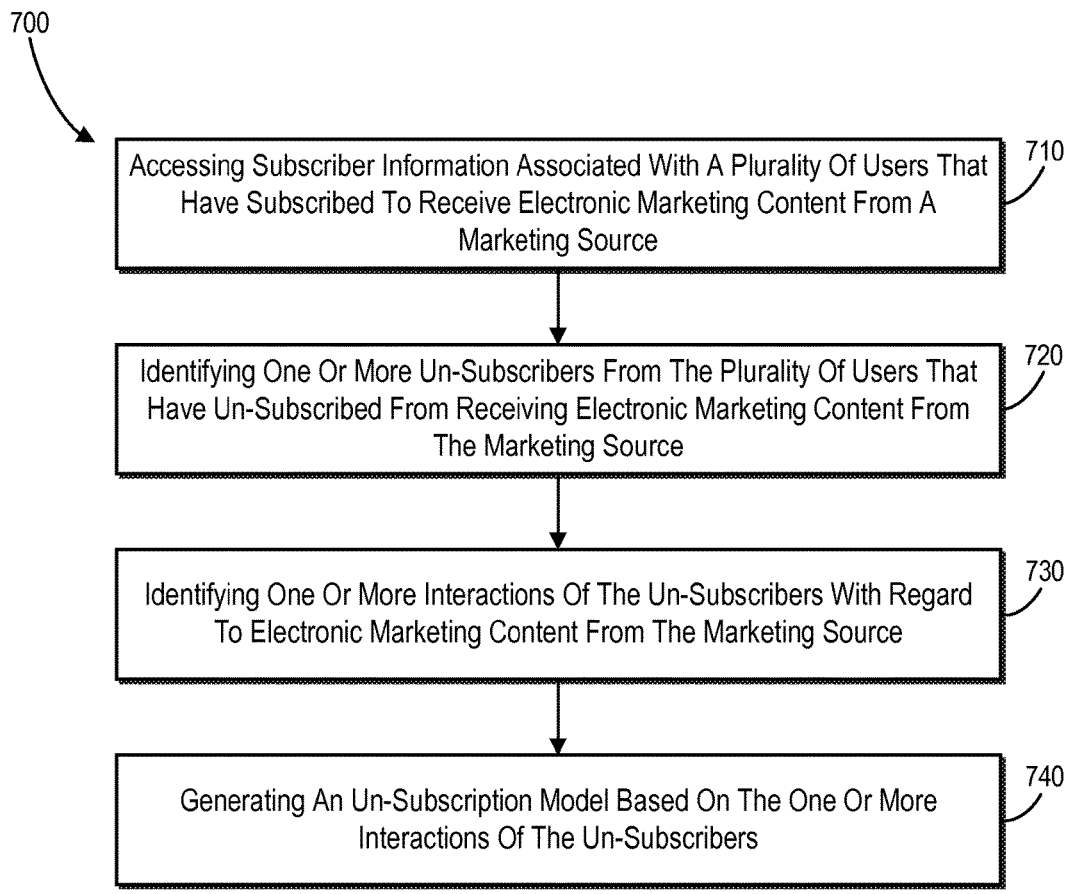
FIG. 7 illustrates a flowchart of a series of acts in a method for predicting un-subscription from receiving electronic marketing content in accordance with one or more embodiments.
Figure 8:
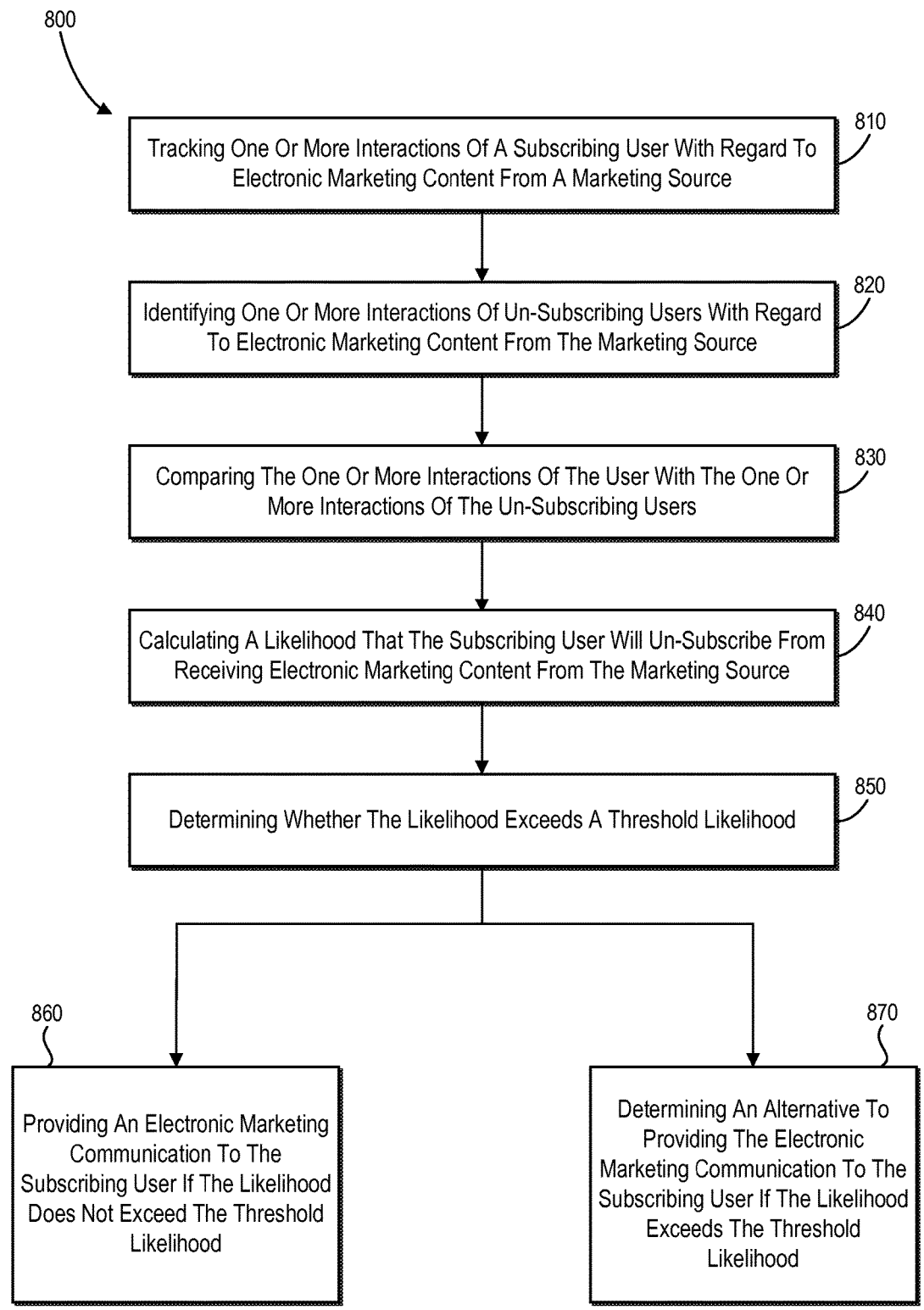
FIG. 8 illustrates a flowchart of a series of acts in another method for predicting un-subscription from receiving electronic marketing content in accordance with one or more embodiments.

FIGS. 1-6, the corresponding text, and the examples, provide a number of different systems and devices for generating an un-subscription model and predicting whether a potential customer will un-subscribe from receiving electronic marketing content from a marketing system 102. In addition to the foregoing, one or more embodiments can also be described in terms of flowcharts comprising acts and steps in a method for accomplishing a particular result. For example, FIGS. 7 and 8 illustrate flowcharts of exemplary methods in accordance with one or more embodiments. The methods described in relation to FIGS. 7 and 8 may be performed with less or more steps/acts or the steps/acts may be performed in differing orders. Additionally, the steps/acts described herein may be repeated or performed in parallel with one another or in parallel with different instances of the same or similar steps/acts.

FIG. 7 illustrates a flowchart of one example method 700 of building an un-subscription model for predicting whether a potential customer will un-subscribe from receiving electronic marketing content from a marketing system 102. The method 700 includes an act 710 of accessing subscriber information associated with a plurality of users that have subscribed to receive electronic marketing content from a marketing source. In particular, the act 710 can involve accessing information associated with un-subscribers and/or current subscribers or any user within a system that has subscribed to receive electronic marketing content from the marketing source.

The method 700 can further include an act 720 of identifying one or more un-subscribers from the plurality of users that have un-subscribed from receiving electronic marketing content from the marketing source. For example, the act 720 may involve identifying each of the users from the plurality of users that has un-subscribed from receiving emails, texts, or other forms of electronic communications from the marketing source. Alternatively, the act 720 may involve identifying a portion of the plurality of users that have un-subscribed from receiving electronic marketing content from the marketing source.

The method 700 can further include an act 730 of identifying one or more interactions associated with the one or more un-subscribers with regard to electronic marketing content from the marketing source. In particular, the act 730 can involve extracting one or more interactions associated with un-subscribers. For example, the act 730 can involve analyzing interactions of an un-subscriber with electronic marketing content (e.g., one or more electronic marketing communications) received by the un-subscriber. Additionally, the act 730 can involve analyzing interactions of an un-subscriber with a website associated with the marketing source. In another example, the act 730 can involve identifying a frequency with which the marketing source has provided electronic marketing content to the un-subscriber. Further, the act 730 can involve identifying and analyzing any number of characteristics or combinations of characteristics associated with one or more un-subscribers.

The method 700 can further include an act 740 of generating an un-subscription model. In particular, the act 740 can involve analyzing the identified interactions associated with un-subscribers and generating an un-subscription model based on the identified interactions. In some embodiments, the act 740 can involve generating the un-subscription model based exclusively on one or more interactions associated with un-subscribers. Alternatively, the act 740 can involve generating the un-subscription model based on one or more interactions associated with un-subscribers and subscribers (e.g., current subscribers). In some embodiments, the un-subscription model can indicate a likelihood that one or more potential customers associated with a set of interactions with respect to marketing content will un-subscribe from receiving electronic marketing content from the marketing source.

The act 740 can involve determining a threshold score that indicates a threshold probability that one or more potential customers associated with a particular set of interactions will un-subscribe from receiving electronic marketing content from the marketing source (e.g., in response to receiving electronic marketing content from the marketing source). Further, in some embodiments, the act 740 can include generating a lift curve that identifies a difference in accuracy between predicting that a first subscriber chosen at random, associated with any given set of interactions with respect to the marketing content will un-subscribe from receiving electronic marketing content and predicting that a second subscriber associated with a particular set of interactions will un-subscribe from receiving electronic marketing content. The act 740, including generating the lift curve, can further involve identifying a cut-off point on the lift curve that indicates a threshold probability that a potential customer associated with a particular set of interactions will un-subscribe from receiving electronic marketing content from the marketing source.

FIG. 8 illustrates a flowchart of one example method 800 of determining whether a potential customer will un-subscribe from receiving electronic marketing content in response to receiving a communication from a marketing source. The method 800 includes an act 810 of tracking one or more interactions of a subscribing user with regard to electronic marketing content from a marketing source. In particular, the act 810 can involve extracting and analyzing interactions associated with a potential customer that has subscribed to receive electronic marketing content from the marketing source. For example, the act 810 can involve analyzing an interaction of the subscriber with electronic marketing content received (e.g., by the subscriber) from the marketing source. Further, the act 810 can involve analyzing one or more interactions of the subscriber with a website associated with the marketing source. Additionally, the act 810 can involve identifying a frequency with which one or more communications from the marketing source have been provided to the subscriber.

The method 800 can further include an act 820 of identifying one or more interactions of un-subscribing users with regard to electronic marketing content from the marketing source. For example, the act 820 can involve identifying interactions of un-subscribing users with electronic marketing content received from a marketing source. Further, the act 820 can involve identifying one or more interactions of un-subscribing users with a website associated with the marketing source. Additionally, the act 820 can involve identifying a frequency with which one or more communications from the marketing source were provided to the un-subscribing users.

Additionally, the method 800 can include an act 830 of comparing the one or more interactions of the user with the one or more interactions of the un-subscribing users. For example, the act 830 can involve identifying similarities and/or differences between interactions by the un-subscribing users and the subscribing user. Further, the act 830 can involve associating scores with various interactions and/or generating a prediction model for determining whether a potential customer will un-subscribe from receiving marketing content from a marketing source.

The method 800 can further include an act 840 of calculating subscriber likelihood (e.g., based on a set of interactions associated with the subscriber) that the subscribing user will un-subscribe from receiving electronic content from the marketing source. The act 840 can involve calculating a combined score associated with multiple interactions from the set of interactions. Further, the act 840 can involve weighting a score associated with one or more interactions from the set of interactions more heavily than one or more interactions from the set of interactions. In some embodiments, the act 840 can involve using an un-subscription model for associating values with one or more interactions and calculating a score for a particular set of interactions. Additionally, calculating the likelihood of un-subscription can include calculating an un-subscription score associated with a likelihood or probability that the subscribing user will un-subscribe from receiving electronic content from the marketing source (e.g., in response to receiving an electronic marketing communication from the marketing source).

The method 800 can further include an act 850 of determining whether the likelihood exceeds a threshold likelihood. In some embodiments, the act 850 can involve using an un-subscription model to compare the likelihood of un-subscription for the subscriber to the threshold likelihood and further determining that the subscriber is prone to un-subscribe from receiving electronic marketing content from the marketing source in response to receiving additional content (e.g., an email, text, social networking message).

The method 800 can further include one or more acts performed based on determining whether the likelihood of un-subscription exceeds the threshold likelihood. For example, the method 800 can include an act 860 of providing an electronic marketing content communication to the subscriber if the likelihood does not exceed the threshold likelihood. For example, the act 860 can involve delivering an email, text, or other electronic marketing content communication to the subscriber if an un-subscription score for the subscriber indicates that the subscriber is less prone to un-subscribe from receiving electronic marketing content from the marketing source.

Additionally, the method 800 can include an act 870 of determining an alternative to providing the electronic marketing content communication to the subscribing user if the likelihood exceeds the threshold likelihood. For example, the act 870 can involve determining an alternative to delivering an email, text, or other electronic marketing content communication to the subscribing user if an un-subscription score for the subscribing user indicates that the subscribing user is prone to un-subscribe from receiving electronic marketing content from the marketing source. For instance, the act 870 may involve determining to not provide the electronic marketing content to the subscriber. Further, the act 870 may involve determining an alternative communication platform for providing an alternate communication to the subscribing user.

In some embodiments, the method 800 may further include an act of determining a projected effectiveness of providing the communication to the subscriber. For example, in addition to determining whether an subscriber is more or less prone to un-subscribe from receiving electronic marketing content from a marketing source, the method 800 may further involve determining that a subscriber is more or less likely interact with the communication to visit a website associated with the marketing source and eventually purchase a product from a merchant. Thus, the method 800 may involve determining whether providing a communication to the subscribing user is more or less likely to translate into a purchase by the subscribing user. Additionally, the method 800 may include an act of determining whether to provide the communication to the subscribing user further based on the projected effectiveness of providing the communication to the subscribing user.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. In some embodiments, computer-executable instructions are executed on a general purpose computer to turn the general purpose computer into a special purpose computer implementing elements of the disclosure. The computer executable instructions may be, for example, binaries, intermediate format instructions such as assembly language, or even source code. Although the subject matter has been described in language specific to structural marketing features and/or methodological acts, it is to be understood that the subject matter defined in the appended claims is not necessarily limited to the described marketing features or acts described above. Rather, the described marketing features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as an un-subscription model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing un-subscription model can be composed of various characteristics such as, for example, on-demand self-service, broad network access, resource pooling, rapid elasticity, measured service, and so forth. A cloud-computing un-subscription model can also expose various service un-subscription models, such as, for example, Software as a Service ("SaaS"), Platform as a Service ("PaaS"), and Infrastructure as a Service ("IaaS"). A cloud-computing un-subscription model can also be deployed using different deployment un-subscription models such as private cloud, community cloud, public cloud, hybrid cloud, and so forth. In this description and in the claims, a "cloud-computing environment" is an environment in which cloud computing is employed.

Figure 9:
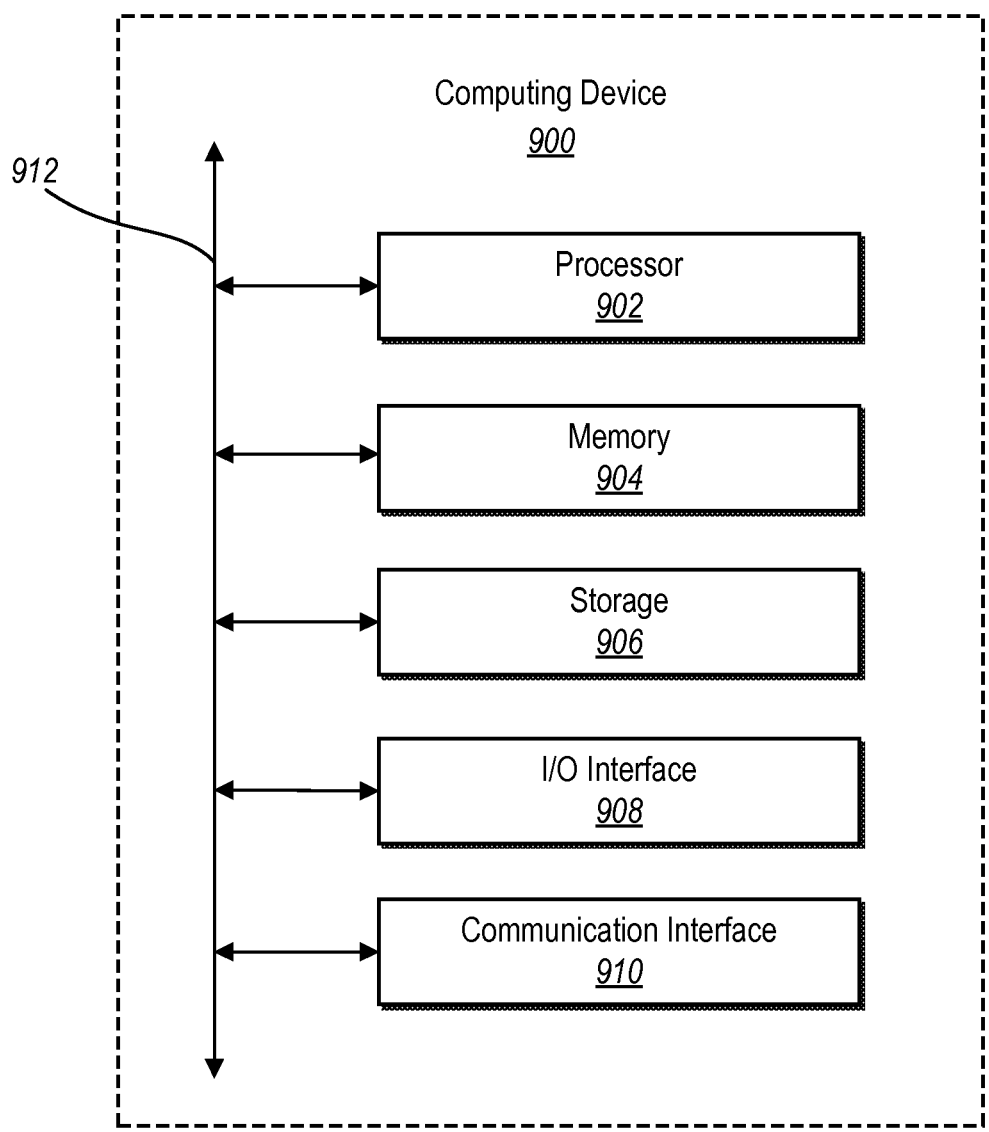
FIG. 9 illustrates a block diagram of an exemplary computing device in accordance with one or more embodiments.

FIG. 9 illustrates a block diagram of an exemplary computing device 900 that may be configured to perform one or more of the processes described above. One will appreciate that the marketing system 102 may be implemented by one or more computing devices such as the computing device 900. As shown by FIG. 9, the computing device 900 can comprise a processor 902, memory 904, a storage device 906, an I/O interface 908, and a communication interface 910, which may be communicatively coupled by way of a communication infrastructure 912. While an exemplary computing device 900 is shown in FIG. 9, the components illustrated in FIG. 9 are not intended to be limiting. Additional or alternative components may be used in other embodiments. Furthermore, in certain embodiments, the computing device 900 can include fewer components than those shown in FIG. 9. Components of the computing device 900 shown in FIG. 9 will now be described in additional detail.

In particular embodiments, the processor 902 includes hardware for executing instructions, such as those making up a computer program. As an example and not by way of limitation, to execute instructions, the processor 902 may retrieve (or fetch) the instructions from an internal register, an internal cache, the memory 904, or the storage device 906 and decode and execute them. In particular embodiments, the processor 902 may include one or more internal caches for data, instructions, or addresses. As an example and not by way of limitation, the processor 902 may include one or more instruction caches, one or more data caches, and one or more translation lookaside buffers (TLBs). Instructions in the instruction caches may be copies of instructions in the memory 904 or the storage 906.

The memory 904 may be used for storing data, metadata, and programs for execution by the processor(s). The memory 904 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 904 may be internal or distributed memory.

The storage device 906 includes storage for storing data or instructions. As an example and not by way of limitation, the storage device 906 can comprise a non-transitory storage medium described above. The storage device 906 may include a hard disk drive (HDD), a floppy disk drive, flash memory, an optical disc, a magneto-optical disc, magnetic tape, or an universal Serial Bus (USB) drive or a combination of two or more of these. The storage device 906 may include removable or non-removable (or fixed) media, where appropriate. The storage device 906 may be internal or external to the computing device 900. In particular embodiments, the storage device 906 is non-volatile, solid-state memory. In other embodiments, the storage device 906 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

The I/O interface 908 allows a user to provide input to, receive output from, and otherwise transfer data to and receive data from the computing device 900. The I/O interface 908 may include a mouse, a keypad or a keyboard, a touch screen, a camera, an optical scanner, network interface, modem, other known I/O devices or a combination of such I/O interfaces. The I/O interface 908 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 908 is configured to provide graphical data to a display for presentation to a user. The graphical data may be representative of one or more graphical user interfaces and/or any other graphical content as may serve a particular implementation.

The communication interface 910 can include hardware, software, or both. In any event, the communication interface 910 can provide one or more interfaces for communication (such as, for example, packet-based communication) between the computing device 900 and one or more other computing devices or networks. As an example and not by way of limitation, the communication interface 910 may include a network interface controller (NIC) or network adapter for communicating with an Ethernet or other wire-based network or a wireless NIC (WNIC) or wireless adapter for communicating with a wireless network, such as a WI-FI.

Additionally or alternatively, the communication interface 910 may facilitate communications with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, the communication interface 910 may facilitate communications with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination thereof.

Additionally, the communication interface 910 may facilitate communications various communication protocols. Examples of communication protocols that may be used include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, Long Term Evolution ("LTE") technologies, wireless communication technologies, in-band and out-of-band signaling technologies, and other suitable communications networks and technologies.

The communication infrastructure 912 may include hardware, software, or both that couples components of the computing device 900 to each other. As an example and not by way of limitation, the communication infrastructure 912 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

In the foregoing specification, the present disclosure has been described with reference to specific exemplary embodiments thereof. Various embodiments and aspects of the present disclosure(s) are described with reference to details discussed herein, and the accompanying drawings illustrate the various embodiments. The description above and drawings are illustrative of the disclosure and are not to be construed as limiting the disclosure. Numerous specific details are described to provide a thorough understanding of various embodiments of the present disclosure.

The present disclosure may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

What is claimed is:

1. In a digital medium environment for communicating electronic marketing content, a method for predicting un-subscription from receiving electronic marketing content in the digital medium environment, comprising:

tracking, by at least one processor, one or more interactions of a subscribing user with regard to electronic marketing content from a marketing source;

identifying, by the at least one processor, previously-performed user interactions of un-subscribing users with regard to electronic marketing content from one or more marketing sources, the un-subscribing users comprising a plurality of users that have un-subscribed from receiving electronic marketing content from the one or more marketing sources;

generating an un-subscription model that predicts whether a potential user having a particular set of interactions with regard to electronic marketing content will un-subscribe from receiving electronic marketing content from the marketing source, wherein generating the un-subscription model comprises:

using a function to learn a comparative effect of each of the identified user interactions of the un-subscribing users on a likelihood of un-subscription;

generating a plurality of weighted interaction values associated with respective user interactions based on the learned comparative effects; and associating a weighted interaction value with each of the user interactions;

applying, by the at least one processor, the un-subscription model to the one or more interactions of the subscribing user to determine a likelihood that the subscribing user will un-subscribe from receiving electronic marketing content from the marketing source in response to receiving an electronic marketing communication from the marketing source via a first electronic communication channel between the marketing source and the subscribing user by generating an un-subscription score by combining the weighted interaction values associated with the one or more interactions of the subscribing user;

determining, by the at least one processor, whether the un-subscription score exceeds a threshold that the subscribing user will un-subscribe from receiving electronic marketing content from the marketing source in response to receiving an electronic marketing communication from the marketing source via the first electronic communication channel;

if the un-subscription score does not exceed the threshold, providing the electronic marketing communication to the subscribing user via the first electronic communication channel; and if the un-subscription score exceeds the threshold, providing an alternative electronic marketing communication to the subscribing user via a second electronic communication channel, the second electronic communication channel comprising a different communication channel than the first electronic communication channel.

2. The method of claim 1, wherein tracking one or more interactions of the subscribing user with regard to electronic marketing content comprises analyzing one or more interactions of the subscribing user with emails including electronic marketing content from the marketing source.

3. The method of claim 1, wherein tracking one or more interactions of the subscribing user with regard to electronic marketing content comprises analyzing one or more interactions of the subscribing user with a website associated with the marketing source.

4. The method of claim 1, wherein tracking one or more interactions of the subscribing user with regard to electronic marketing content comprises identifying a recency with which electronic marketing content from the marketing source has been provided to the subscribing user.

5. The method of claim 1, wherein applying the un-subscription model to the one or more interactions of the subscribing user to determine the likelihood for the subscribing user comprises generating the un-subscription score combining the weighted interaction values associated with multiple types of interactions of the subscribing user with regard to electronic marketing content.

6. The method of claim 5, wherein applying the un-subscription model to the one or more interactions of the subscribing user to determine the combined score comprises weighting a score associated with one or more types of interactions of the subscribing user more heavily than one or more other types of interactions of the subscribing user based on the weighted interaction values.

7. The method of claim 1, wherein using the function to learn the comparative effect of each of the identified user interactions of the un-subscribing users on the likelihood of un-subscription and generating the plurality of weighted interaction values associated with respective user interactions based on the learned comparative effects comprises using a logistic regression to estimate the plurality of weighted interaction values.

8. The method of claim 1, further comprising:
determining a projected effectiveness of providing the electronic marketing communication to the subscribing user; and
identifying the threshold that the subscribing user will un-subscribe from receiving electronic marketing content from the marketing source based on the projected effectiveness of providing the electronic marketing communication to the subscribing user.

9. The method of claim 1, wherein the first electronic communication channel comprises an email messaging platform, and wherein the second electronic communication channel comprises a text messaging platform, an instant messaging platform, a social media platform, or a website associated with the marketing source.

10. The method of claim 1, wherein generating the un-subscription model comprises training a neural network.

11. A non-transitory computer readable medium storing instructions thereon that, when executed by at least one processor, cause a computer system to:
access subscriber information associated with a plurality of users that have subscribed to receive electronic marketing content via a first communication channel from a marketing source;
identify one or more un-subscribers from the plurality of users that have un-subscribed from receiving electronic marketing content from the marketing source;
identify one or more interactions of the un-subscribers with regard to electronic marketing content from the marketing source; and
generate an un-subscription model based on the one or more interactions of the un-subscribers to determine a likelihood that one or more potential customers associated with a set of interactions will un-subscribe from receiving electronic marketing content from the marketing source in response to receiving an electronic marketing communication via the first communication channel from the marketing source, wherein generating the un-subscription model comprises:
using a function to learn a comparative effect of each of the identified user interactions of the un-subscribers on a likelihood of un-subscription;
generating a plurality of weighted interaction values associated with respective user interactions based on the learned comparative effects; and
associating a weighted interaction value with each of the user interactions of the un-subscribers;
apply the un-subscription model to a plurality of interactions by a subscribing user to determine that the subscribing user will likely un-subscribe from receiving electronic marketing content from the marketing source in response to receiving an electronic marketing communication from the marketing source via the first communication channel by generating an un-subscription score by combining the weighted interaction values associated with the one or more interactions of the subscribing user; and
based on a determination that the subscribing user will likely un-subscribe from receiving electronic marketing content in response to receiving an electronic marketing communication from the marketing source via the first communication channel, provide an alternative electronic marketing communication to the subscribing user via a second electronic communication channel, the second electronic communication channel comprising a different communication channel than the first electronic communication channel.

12. The non-transitory computer readable medium of claim 11, wherein the instructions, when executed by the at least one processor, cause the computer system to use the function to learn the comparative effect of each of the identified user interactions of the un-subscribers on the likelihood of un-subscription and generating the plurality of weighted interaction values associated with respective user interactions based on the learned comparative effects comprises by using a logistic regression to estimate the plurality of weighted interaction values.

13. The non-transitory computer readable medium of claim 11, wherein the instructions, when executed by the at least one processor, cause the computer system to identify the one or more interactions by:
analyzing one or more interactions of the un-subscribers with a website associated with the marketing source;
analyzing one or more interactions of the un-subscribers with electronic marketing content from the marketing source via the first communication channel; and
identifying a frequency with which electronic content been provided to the un-subscribers.

14. The non-transitory computer readable medium of claim 11, wherein the instructions, when executed by the at least one processor, cause the computer system to generate the un-subscription model by determining a threshold likelihood that the one or more potential customers associated with a set of one or more interactions with regard to the marketing content will un-subscribe from receiving electronic marketing content from the marketing source in response to receiving an electronic marketing communication from the marketing source via the first communication channel.

15. The non-transitory computer readable medium of claim 11, wherein the instructions, when executed by the at least one processor, cause the computer system to generate the un-subscription model by generating a lift curve that identifies a difference in accuracy between predicting that a first subscriber chosen at random will un-subscribe from receiving electronic marketing content and predicting that a second subscriber associated with a set of interactions will un-subscribe from receiving electronic marketing content.

16. The non-transitory computer readable medium of claim 15, further comprising identifying a cut-off point on the lift curve, the cut-off point indicating a threshold probability that a potential customer associated with a particular set of interactions will un-subscribe from receiving electronic marketing content from the marketing source in response to receiving an electronic marketing communication from the marketing source via the first communication channel.

17. A system comprising:
   at least one processor; and
   at least one non-transitory computer-readable storage medium storing instructions thereon that, when executed by the at least one processor, cause the system to:
      track one or more interactions of a subscribing user with regard to electronic marketing content from a marketing source;
      identify one or more previously-performed interactions of un-subscribing users with regard to electronic marketing content from the marketing source, the un-subscribing users comprising a plurality of users that have un-subscribed from receiving electronic marketing content from the marketing source;
      generate an un-subscription model that predicts whether a potential user having a particular set of interactions with regard to electronic marketing content will un-subscribe from receiving electronic marketing content from the marketing source, wherein generating the un-subscription model, wherein generating the un-subscription model comprises:
         using a function to learn a comparative effect of each of the identified user interactions of the un-subscribing users on a likelihood of un-subscription;
         generating a plurality of weighted interaction values associated with respective user interactions based on the learned comparative effects; and
         associating a weighted interaction value with each of the user interactions;
      apply the un-subscription model to the one or more interactions of the subscribing user to determine, based on the comparison of the one or more interactions of the user with the one or more interactions of the un-subscribing users, a likelihood that the subscribing user will un-subscribe from receiving electronic marketing content from the marketing source in response to receiving an electronic marketing communication from the marketing source via a first electronic communication channel between the marketing source and the subscribing user by generating an un-subscription score by combining the weighted interaction values associated with the one or more interactions of the subscribing user;
      determine whether the un-subscription score exceeds a threshold that the subscribing user will un-subscribe from receiving electronic marketing content from the marketing source in response to receiving an electronic marketing communication from the marketing source via the first electronic communication channel;
      if the un-subscription score does not exceed the threshold, provide an electronic marketing communication to the subscribing user via the first electronic communication channel; and
      if the un-subscription score exceeds the threshold, provide an alternative electronic marketing communication to the subscribing user via a second electronic communication channel, the second electronic communication channel comprising a different communication channel than the first electronic communication channel.

18. The system of claim 17, wherein the instructions that cause the system to track the one or more interactions further comprise instructions that cause the system to:
   analyze one or more interactions of the subscribing user with electronic marketing content from the marketing source;
   analyze one or more interactions of the subscribing user with a website associated with the marketing source; and
   identify a frequency with which electronic marketing content from the marketing source has been provided to the user.

19. The system of claim 17, wherein the first electronic communication channel comprises an email, and if the un-subscription score exceeds the threshold, determining the alternative to providing the electronic marketing communication to the subscribing user further comprises determining an alternative communication platform to email for providing a communication to the user via the second electronic communication channel.

* * * * *